(12) United States Patent
Suzuki

(10) Patent No.: US 9,025,565 B2
(45) Date of Patent: May 5, 2015

(54) WIRELESS COMMUNICATION CONTROL METHOD AND WIRELESS COMMUNICATION DEVICE

(75) Inventor: Masaaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 13/334,915

(22) Filed: Dec. 22, 2011

(65) Prior Publication Data

US 2012/0093127 A1 Apr. 19, 2012

Related U.S. Application Data

(63) Continuation of application No. PCT/JP2009/003056, filed on Jul. 1, 2009.

(51) Int. Cl.
*H04W 28/18* (2009.01)
*H04L 1/18* (2006.01)

(52) U.S. Cl.
CPC ............. *H04W 28/18* (2013.01); *H04L 1/1864* (2013.01); *H04L 1/1858* (2013.01); *H04L 1/1825* (2013.01); *H04L 1/18* (2013.01)

(58) Field of Classification Search
None
See application file for complete search history.

(56) References Cited

U.S. PATENT DOCUMENTS

| | | | |
|---|---|---|---|
| 2003/0129989 A1* | 7/2003 | Gholmieh et al. | 455/452 |
| 2005/0157696 A1* | 7/2005 | Yamamoto | 370/349 |
| 2006/0111100 A1 | 5/2006 | Murata et al. | |
| 2006/0198340 A1 | 9/2006 | Murata et al. | |
| 2008/0123595 A1 | 5/2008 | Lindheimer et al. | |
| 2008/0125049 A1* | 5/2008 | Suzuki et al. | 455/63.1 |
| 2008/0137689 A1* | 6/2008 | Shiizaki et al. | 370/498 |
| 2008/0274729 A1* | 11/2008 | Kim et al. | 455/423 |
| 2009/0040959 A1* | 2/2009 | Jung et al. | 370/312 |
| 2009/0163199 A1* | 6/2009 | Kazmi et al. | 455/425 |
| 2009/0168920 A1* | 7/2009 | Chen | 375/295 |

FOREIGN PATENT DOCUMENTS

| | | |
|---|---|---|
| EP | 1 662 688 | 5/2006 |
| EP | 1 919 114 | 5/2008 |
| EP | 2 015 500 | 1/2009 |
| JP | 2006-157133 | 6/2006 |
| JP | 2006-246089 | 9/2006 |
| JP | 2007-228488 | 9/2007 |
| JP | 2007-300509 | 11/2007 |
| JP | 2008-118640 | 5/2008 |

(Continued)

OTHER PUBLICATIONS

International Search Report dated Oct. 13, 2009, from corresponding International Application No. PCT/JP2009/003056.

(Continued)

*Primary Examiner* — Faruk Hamza
*Assistant Examiner* — Andrew Oh
(74) *Attorney, Agent, or Firm* — Katten Muchin Rosenman LLP

(57) ABSTRACT

Provided is a communication control method in a mobile radio system in which a transmission side radio communication device is connected to a reception side radio communication device via radio propagation path. A parameter for data link control is set in the transmission side radio communication device and the reception side radio communication device. The set parameter such as a parameter of a layer is modified by using a state change of the radio propagation path as a trigger.

11 Claims, 21 Drawing Sheets

(56) References Cited

FOREIGN PATENT DOCUMENTS

| | | |
|---|---|---|
| JP | 2008-527794 | 7/2008 |
| WO | 2009/034089 | 3/2009 |

OTHER PUBLICATIONS

European Search Report dated Jan. 26, 2015 from corresponding Application No. 09846764.0.

* cited by examiner

FIG. 7

| 1 | 2 | 3 | 4 | | |
|---|---|---|---|---|---|
| | | | COMMUNICATION SERVICE | | |
| SUBLAYER | ID | PARAMETER | BE | VoIP | Streaming |
| PDCP | P1 | Reordering | ON | ON | ON |
| | P2 | RECEPTION WINDOW SIZE | 1024 | 1024 | 1024 |
| RLC | P3 | RLC mode | AM | AM | UM |
| | P4 | Rx Window SIZE | 128 | 128 | 128 |
| | P5 | Tx Window SIZE | 128 | 128 | 128 |
| | P6 | Window based polling | On | OFF | – |
| | P7 | Poll Window | 80ms | 50ms | 50ms |
| | P8 | Poll timer | 50ms | 50ms | – |
| | P9 | poll_prohibit timer | 30ms | – | – |
| | P10 | poll prohibit | On | OFF | – |
| | P11 | Reorderin timer | 50ms | OFF | – |
| | P12 | STATUS prohibit timer | OFF | OFF | – |
| | P13 | STATUS prohibit | OFF | OFF | On |
| | P14 | FORWARDING BETWEEN BASE STATIONS (WHICH IS A FUNCTION ONLY IN THE BASE STATION) | ON | OFF | ON |
| MAC | P15 | MAXIMUM NUMBER OF TIMES OF L1-HARQ RETRANSMISSION | 8 | 8 | 8 |
| | P16 | BUFFER STAGNANT AMOUNT CORRECTION COEFFICIENT (WHICH IS A FUNCTION ONLY IN THE MOBILE STATION) | ACTUALLY MEASURED VALUE | ACTUALLY MEASURED VALUE | ACTUALLY MEASURED VALUE |

FIG. 10

| | | | 4 SIR | 5 RETRANSMISSION RATIO | | | | HANDOVER |
|---|---|---|---|---|---|---|---|---|
| | | | | SIR>20dB | 20dB≧SIR>15dB | 15dB≧SIR>10dB | 10dB≧SIR | |
| | | | X | X<20% | 20%≦X<40% | 40%≦X<60% | 60%≦X | |
| SUB-LAYER | ID | PARAMETER | CONVEN-TIONAL BE | PARAMETER SET 1 | PARAMETER SET 2 | PARAMETER SET 3 | PARAMETER SET 4 | PARAMETER SET 5 |
| PDCP | P1 | Reordering | ON | | ON | | | ON |
| | P2 | RECEPTION WINDOW SIZE | 1024 | | 1024 | | | 512 |
| RLC | P3 | RLC mode | AM | | AM | | | AM |
| | P4 | Rx Window SIZE | 128 | 128 | 128 | 64 | 64 | 64 |
| | P5 | Tx Window SIZE | 128 | 128 | 128 | 64 | 64 | 64 |
| | P6 | Window based polling | ON | OFF | OFF | On | On | On |
| | P7 | Poll Window | 80 | - | - | 50 | 50 | 50 |
| | P8 | Poll timer | 50ms | 30ms | 70ms | 100ms | 120ms | 120ms |
| | P9 | poll_prohibit timer | 30ms | OFF | OFF | 80ms | 100ms | 100ms |
| | P10 | poll prohibit | ON | OFF | OFF | On | On | On |
| | P11 | Reordering timer | 50ms | 30ms | 70ms | 100ms | 120ms | 120ms |
| | P12 | STATUS prohibit timer | 50ms | - | - | 100ms | 120ms | 120ms |
| | P13 | STATUS prohibit | ON | OFF | OFF | ON | ON | ON |
| | P14 | FORWARDING BETWEEN BASE STATIONS (WHICH IS A FUNCTION ONLY IN THE BASE STATION) | ON | | ON | | | ON |
| MAC | P15 | MAXIMUM NUMBER OF TIMES OF L1-HARQ RETRANSMISSION | 8 | 8 | 6 | 4 | 2 | 2 |
| | P16 | BUFFER STAGNANT AMOUNT CORRECTION COEFFICIENT (WHICH IS A FUNCTION ONLY IN THE MOBILE STATION) | 1 | 1 | 1 | 1/4 | 1/4 | 1/4 |

WIRELESS COMMUNICATION CONTROL METHOD AND WIRELESS COMMUNICATION DEVICE

CROSS-REFERENCE TO RELATED APPLICATIONS

This application is a continuation of international application PCT/JP2009/003056, filed on Jul. 1, 2009.

TECHNICAL FIELD

The present invention relates to a wireless communication control method and a wireless communication device.

BACKGROUND ART

In a hierarchy of a wireless interface that conforms to an OSI reference model of a wideband-code division multiple access (W-CDMA) mobile communication system, a layer 2 (data link layer) is mainly subject to terminals interconnection and data link control that transfers data unmistakably.

Further, the layer 2 includes three sublayers of a media access control (MAC) layer, a radio link control (RLC) layer, and a packet data convergence protocol (PDCP) layer; the function unit in each of the sublayers performs individual processing.

The aspects of the processing pieces performed in the function units in the respective sublayers are in accordance with a value set in parameters in the layer 2. For example, the parameters in the layer 2 determine an upper limit of the information storage capacity of a buffer which is used in each of the processing pieces and timing at which retransmission processing is performed.

Conventionally, the parameters in the layer 2 have been set by the function unit in layer 3, which is higher in order. The function unit in layer 3 decides the type of a communication service such as speech call or information streaming and, based on a communication rate and an allowed latency time which are prescribed for that communication service, sets the parameters in the layer 2.

That is, conventionally, the layer 2 parameters of a wireless communication device in communication have been statically set beforehand based on a communication service etc. and remained a fixed value without being changed to an appropriate value even if a deterioration in state of a wireless propagation path degraded a communication situation.

FIG. 1 is a schematic diagram of a wireless communication system including base stations and mobile stations. Base stations 320, 330, 340, and 350 perform wireless communication with the mobile stations present in cells 321, 331, 341, and 351 respectively. The base stations 320, 330, 340, and 350 are each connected to a core network (CNW). Further, the base stations 320 and 330 and the base stations 340 and 350 configure the different wireless communication systems in such a configuration that those two systems may communicate with each other via the core network (CNW).

The wireless propagation path may change, for example, in a case where the mobile station 310 moves speedily or goes away from the base station 320 when the base station 320 and the mobile station 310 are communicating with each other.

Further, in a case where the mobile station 311 is communication at an edge of the cell of the base station 320 as illustrated in FIG. 1, its inbound signal interferes with signal from the neighboring base station 330 to have an influence on wireless communication in the cell 331.

In view of the above, in an IMT-2000 type S3G system that employs W-CDMA mobile communication, to reduce the interference, the base station 320 suppresses inbound transmission power of the mobile station 311. That is, the wireless propagation path between the mobile station 311 and the base station 320 that is already deteriorated at a cell edge where those stations are far away from each other becomes more deteriorated due to the power suppression function of the base station 320.

Further, if handover occurs as the mobile station 310 moves from the cell 321 into the cell 331, not-yet-arrived data that is not received by the mobile station 310 is transferred from the handover-source base station 320 to the handover-destination base station 330 in inter-station data forwarding processing. The amount of the data transferred in this case can be adjusted by changing the parameters in the layer 2; however, such adjustment has not been performed.

The prior art technologies may include, for example, Patent Documents 1 to 4.

Patent Document 1 has a description to the effect that if HARQ transmission fails, packet data is fragmented and retransmitted on the basis of wireless channel condition and whether handover has occurred.

Patent Document 2 has a description to the effect that in adaptive modulation control for changing a modulation method in accordance with CQI information denoting condition of a wireless environment, a direction in which the wireless environment changes is reflected in the CQI information to conduct adaptive modulation control.

Patent Document 3 has a description to the effect that in adaptive modulation control for changing a modulation method in accordance with CQI information denoting condition of a wireless environment, if a handover occurs, timing at which the CQI information is transmitted is changed.

Patent Document 4 has a description to the effect that if a wireless environment deteriorates, a packet-unitary transmission interval is set longer.

Patent Document 1: Japanese Patent Application Laid-Open No. 2008-118640

Patent Document 2: Japanese Laid-Open Patent Publication No. 2006-157133

Patent Document 3: Japanese Laid-Open Patent Publication No. 2006-246089

Patent Document 4: Japanese Laid-Open Patent Publication No. 2007-300509

However, if the wireless propagation path changes, a variety of transmission losses or delays occur based on values set to the layer 2 parameters. For example, even if communication errors occur consecutively owing to deteriorations in the wireless propagation path, retransmission processing continues based on the existing values set to the layer 2 parameters, so that transmission loads increase.

As for handover, for example, if handover occurs in a plurality of mobile stations simultaneously owing to movement in a train, data forwarding processing based on the existing values set to the layer 2 parameters is performed simultaneously, so that a transmission load or a delay occurs between base stations.

To solve such a problem in transmission load and delay, preferably the layer 2 parameters may be set on the basis of results of decision on the processing by the layer 3 and then dynamically changed following a change in the wireless propagation path or handover.

DISCLOSURE OF THE INVENTION

In view of the above, it is an object in one aspect of the invention to provide a wireless communication control method and wireless communication device that sets layer 2 parameters to appropriate values in the wake of handover or a change in state of a wireless propagation path.

According to an aspect of the invention, in a mobile communication system interconnecting a transmission-side wireless communication device and a reception-side wireless communication device via a wireless propagation path, parameters for data link control are set to the transmission-side wireless communication device and the reception-side wireless communication device, and the set parameters are changed in response to a change in state of the wireless propagation path.

According to another aspect of the invention, the parameters for the data link control in the one aspect are layer 2 protocol parameters.

Effects of the Invention

By the invention described above, it is possible to provide a wireless communication control method and wireless communication device that sets layer 2 parameters to appropriate values in the wake of handover or a change in state of a wireless propagation path.

BRIEF DESCRIPTION OF THE DRAWINGS

FIG. 7 is a table illustrating parameters in the layer 2 related to the present embodiment and their respective setting examples in representative services;

FIG. 10 is a table illustrating a specific example of parameter values in the layer 2 which are dynamically changed in the present embodiment;

DESCRIPTION OF EMBODIMENTS

The following will describe embodiments with reference to the drawings. However, its technological scope is not limited to the embodiments and covers what is described in the claims and the equivalents.

Figure 1:
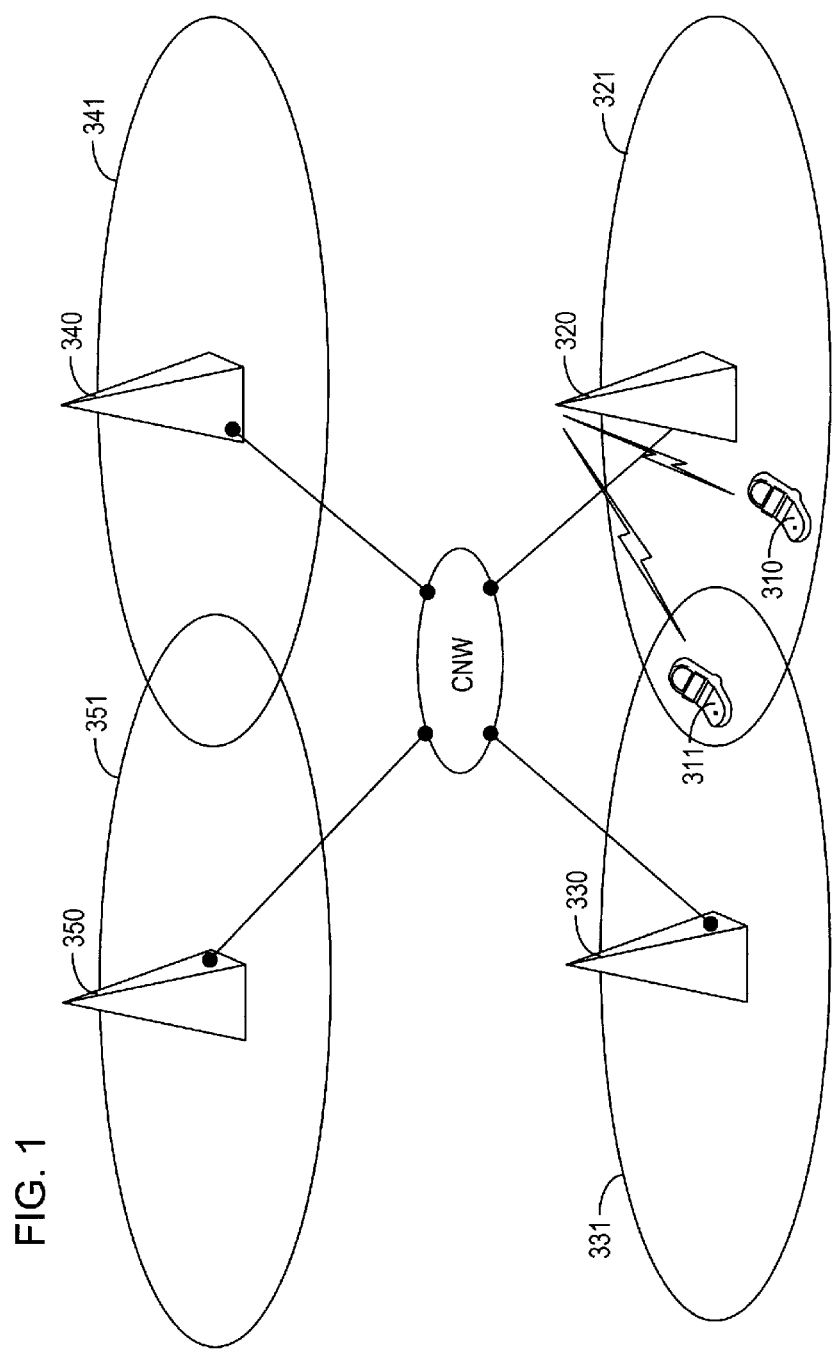
FIG. 1 is a schematic diagram of a wireless communication system including base stations and mobile stations.
Figure 2:
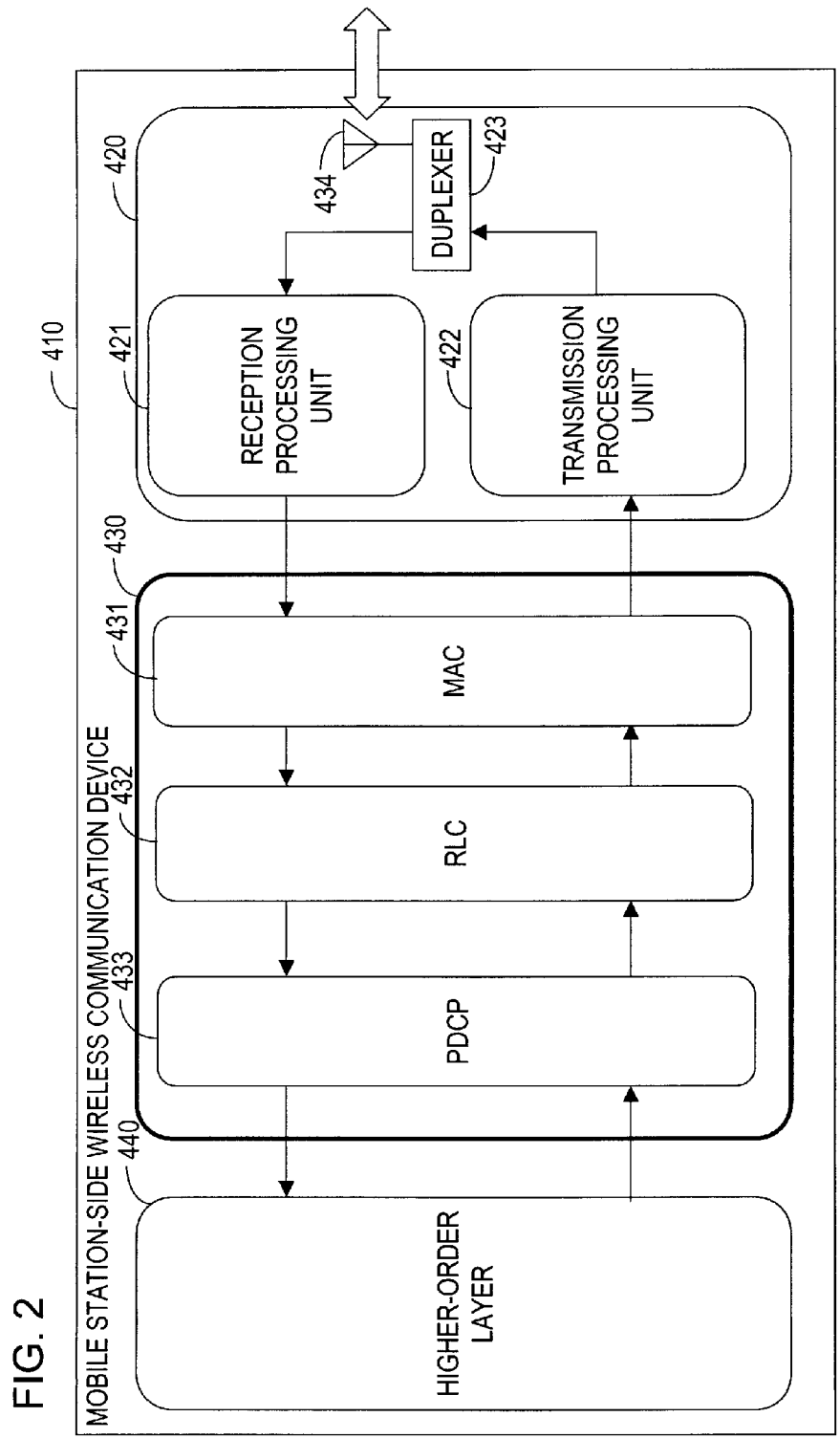
FIG. 2 is a block diagram illustrating a configuration example of a wireless communication device on the side of the mobile station.

FIG. 2 is a block diagram which illustrates a configuration example of a wireless communication device on the side of a mobile station.

Figure 3:
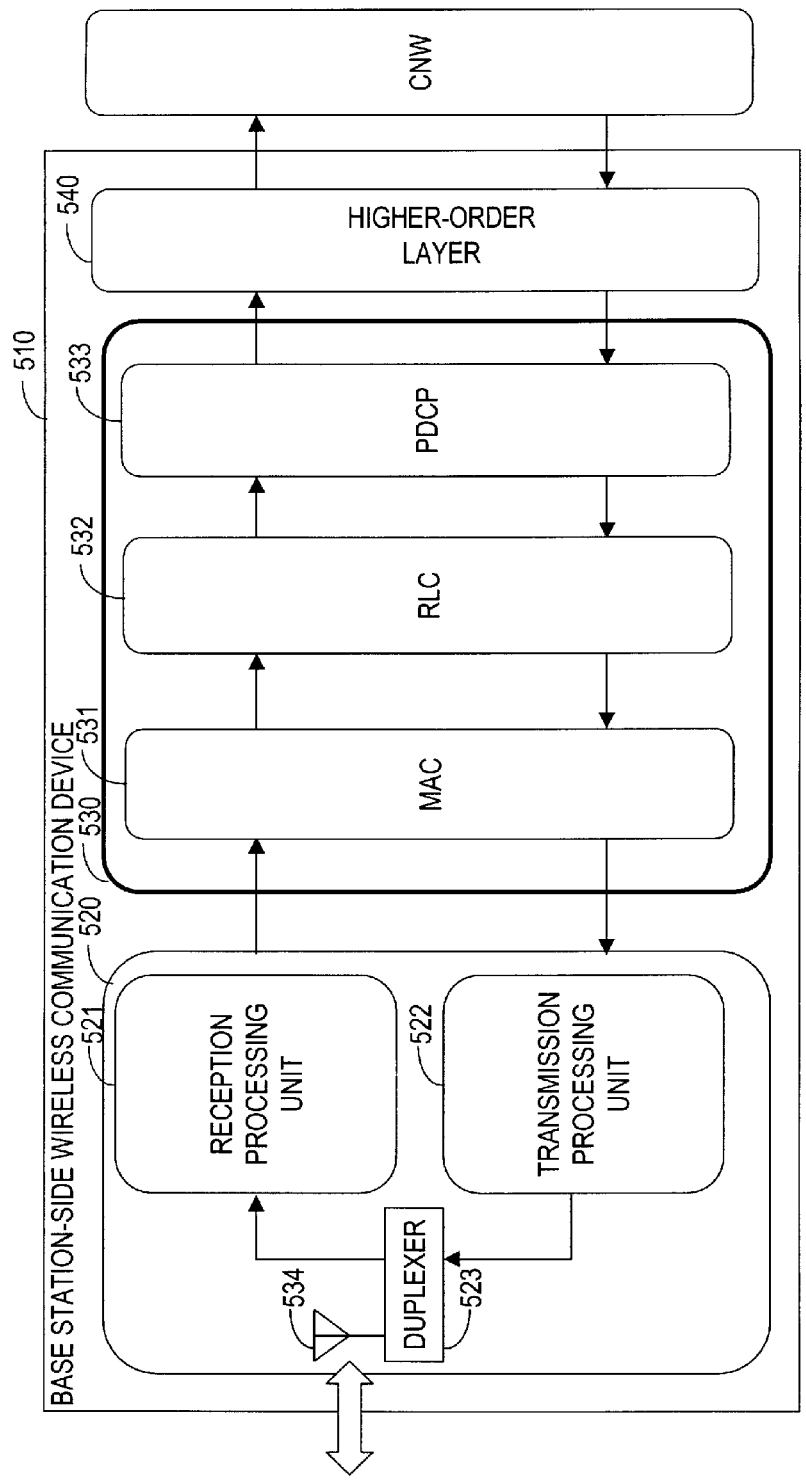
FIG. 3 is a block diagram illustrating a configuration example of a wireless communication device on the side of the base station.

FIG. 3 is a block diagram which illustrates a configuration example of the wireless communication device on the side of a base station. In FIG. 2, a mobile station-side wireless communication device 410 has a function unit 420 in a layer 1, a function unit 430 in a layer 2, and a function unit 440 in a layer 3 or a higher-order layer.

The layer 1 function unit 420 has a reception processing unit 421, a transmission processing unit 422, and a duplexer 423. The layer 1 function unit 420 appropriately switches a shared antenna 424 between use for transmission and use for reception by using functions of the duplexer 423, thereby controlling wireless communication with the base station side.

Specifically, the reception processing unit 421 performs demodulation processing, decoding processing, CRC check processing, etc. on a received signal, while the transmission processing unit 422 performs CRC addition processing, encoding processing, modulation processing, etc. on transmission information.

The layer 2 function unit 430 has an MAC function unit 431, an RLC function unit 432, and a PDCP function unit 433. Those function units sequentially process transmission/reception information and conduct control to interconnect terminals and transfer data unmistakably.

The higher-order layer 440 has the layer 3 function unit and a function unit peculiar to wireless communication with the other mobile objects. As described above, when activating communication services etc., the layer 3 function unit sets the layer 2 parameters to values that depend on those communication services.

The reception processing unit 421 in the mobile station receives outbound information from the base station via the duplexer 423 and performs processing such as demodulation processing on the received signal. Then, the received signal undergoes processing such as error detection in the layer 2 function unit 430 and is output to the higher-order layer function unit 440.

Conversely, in the case of transmitting inbound information from the mobile station to the base station, the layer 2 function unit 430 performs information division processing etc. on image information and speech information such as communication services supplied from the higher-order layer function unit 440 and outputs them to the transmission processing unit 422. Then, the transmission processing unit 422 performs demodulation processing etc. on the incoming information and transmits the inbound information to the side of the base station via the duplexer 423.

Further, FIG. 3 illustrates a configuration example of a base station-side wireless communication device 510 installed on the side of the base station. The base station-side wireless communication device 510 in FIG. 3 is different from the mobile station-side wireless communication device 410 in FIG. 2 in that a higher-order layer function unit 540 is connected to a core network (CNW).

That is, although different in matters of detail, both of the stations have almost the same logical configurations of the function unit 420 (520) in the layer 1 and the function unit 430 (530) in the layer 2, which layers make up the lower-order layer of the wireless communication device.

[First Embodiment]

Figure 4:
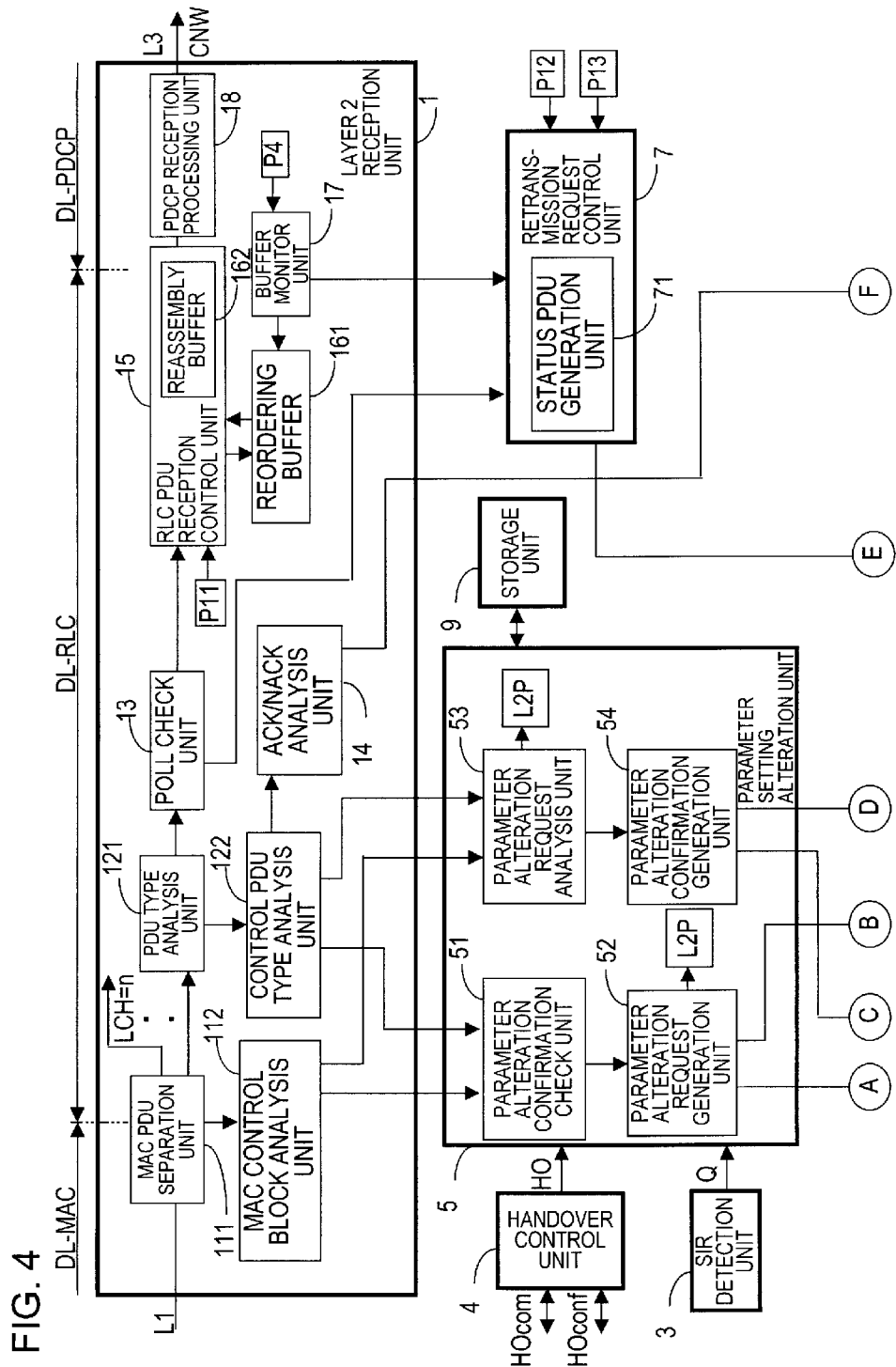
FIG. 4 is a block diagram illustrating a configuration example of a function unit which performs reception processing in a function unit 430 (530) in a layer 2 illustrated in FIG. 2 and FIG. 3 of the wireless communication device in a first embodiment.

FIG. 4 is a block diagram which illustrates a configuration example of a function unit which performs reception processing in a function unit 430 (530) in a layer 2 illustrated in FIG. 2 and FIG. 3 of a wireless communication device in a first embodiment.

Figure 5:
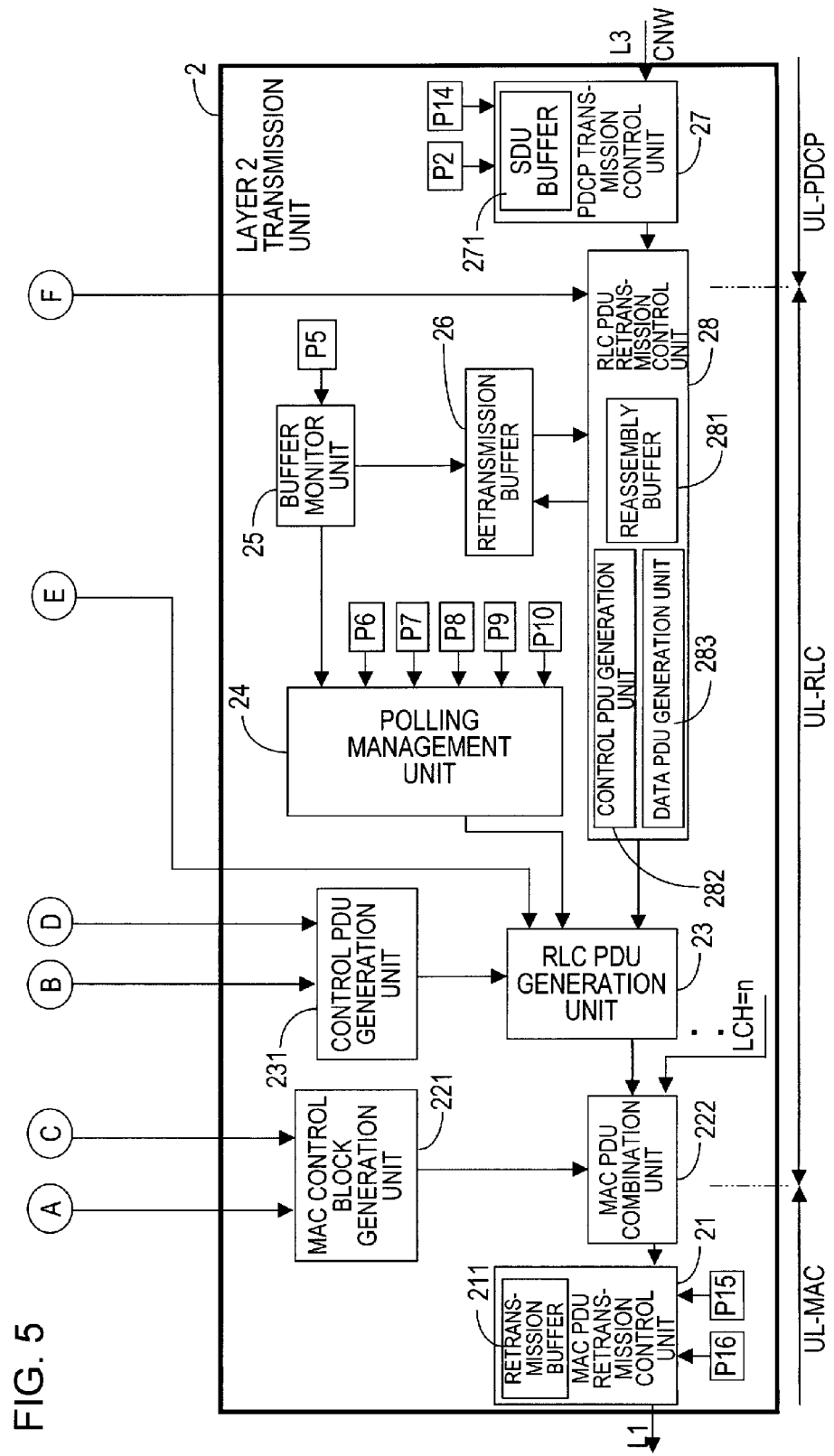
FIG. 5 is a block diagram illustrating a configuration example of the function unit which performs transmission processing in the function unit 430 (530) in the layer 2 illustrated in FIG. 2 and FIG. 3 of the wireless communication device in the first embodiment.

FIG. 5 is a block diagram which illustrates a configuration example of the function unit which performs transmission processing in the function unit 430 (530) in the layer 2 illustrated in FIG. 2 and FIG. 3 of the wireless communication device in the first embodiment. The function units illustrated in FIG. 4 and FIG. 5 are discretely connected to terminals A to F respectively.

As described above, the layer 2 function units 430 (530) in the wireless communication devices respectively mounted on the base station side and the mobile station side in a wireless communication system have almost the same configuration. Accordingly, FIG. 4 and FIG. 5 mainly illustrate the function units common to both of those stations. Hereinafter, unless otherwise specified, the respective configurations in FIG. 4 and FIG. 5 will be described on the wireless communication device without distinguishing between the base station side and the mobile station side.

The layer 2 function unit 430 (530) in the wireless communication device illustrated in FIG. 4 and FIG. 5 has a layer 2 reception unit 1, a layer 2 transmission unit 2, and a retransmission request control unit 7 as its function units. Moreover, the layer 2 function unit 430 (530) has a signal to interference indication (SIR) detection unit 3, a handover control unit 4, a parameter setting alteration unit 5, and a storage unit 9 as its function units. Those function units are each realized in hardware or software.

In FIG. 4, DL (DownKLink)-MAC, DL-RLC, and DL-PDCP illustrated to the layer 2 reception unit 1 correspond to an MAC function unit 431 (531), an RLC function unit 432 (532), and a PDCP function unit 433 (533) in FIG. 2 and FIG. 3 and denote the ranges of processing pieces performed in sublayers on the side of reception respectively. Similarly, in FIG. 5, UL (UpLink)-MAC, UL-RLC, and UL-PDCP described on the side of a layer 2 transmission unit 2 denote the ranges of processing pieces performed in sublayers on the side of transmission respectively.

Figure 6:
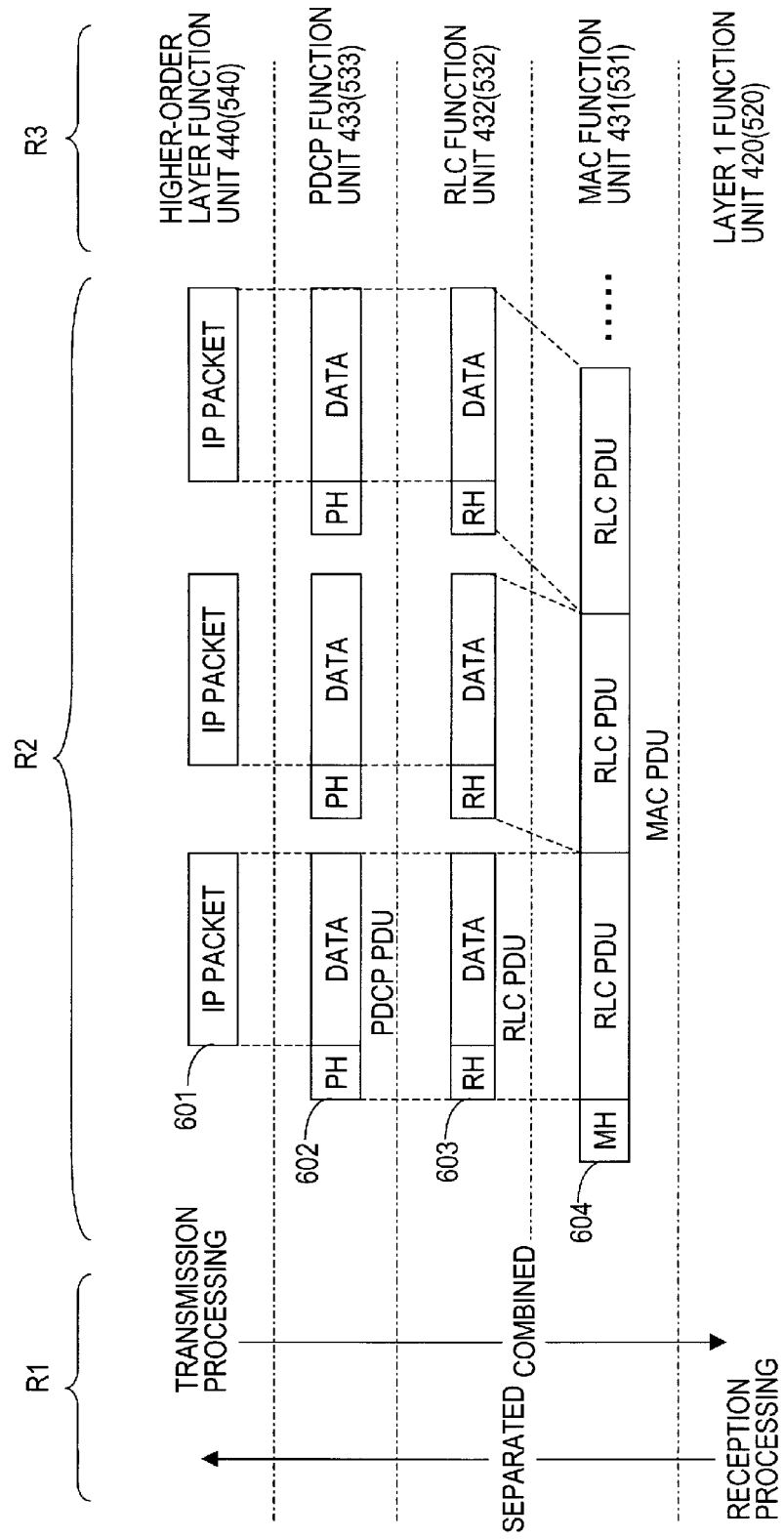
FIG. 6 is a time chart illustrating a data format processed in the function units 431 (531), 432 (532), and 433 (533) in sublayers of the layer 2.

FIG. 6 is a time chart which illustrates a data format processed in the function units 431 (531), 432 (532), and 433 (533) in the sublayers of the layer 2. The function units illustrated in a range R3 in FIG. 6 corresponds to those illustrated in FIG. 2 and FIG. 3, a borderline between which function units is denoted by a broken line. An arrow illustrated in the range R1 denotes the direction of transmission processing and reception processing. A data format of transmission/reception information illustrated in a range R2 is different in the MAC function unit 431 (531), the RLC function unit 432 (532), and the PDCP function unit 433 (533) from each other, so that those function units generate an MAC protocol data unit (PDU), an RLC PDU, and a PDCP PDU respectively.

In transmission processing, a higher-order layer function unit 440 (540) divides transmission information into IP packets 601 and outputs them to the PDCP function unit 433 (533). The PDCP function unit 433 (533) adds a PDCP header PH to the IP packets 601 to process them as a PDCP PDU 602 and outputs them to the RLC function unit 432 (532). The RLC function unit 432 (532) processes the incoming information, adds an RLC header RH to it to generate an RLC PDU 603, and outputs them to the MAC function unit 431 (531). The MAC function unit 431 (531) combines the plurality of incoming RLC PDUs 603, adds an MAC header MH to them generate an MAC PDU 604, and outputs them to the layer 1 function unit 420 (520).

In reception processing, a layer 1 function unit 420 (520) outputs received information as an MAC PDU 604 to the MAC function unit 431 (531). The MAC function unit 431 (531) separates the incoming MAC PDU 604 into the plurality of RLC PDUs 603 and outputs them to the RLC function unit 432 (532). The RLC function unit 432 (532) processes the incoming information, adds the PDCP header PH to it to generate the PDCP PDU 602, and outputs them to the PDCP function unit 433 (533). The PDCP function unit 433 (533) processes the incoming information and outputs it as the IP packets 601 to the higher-order layer function unit 440 (540).

Next, a description will be given of layer 2 parameters related to processing in each of the function units.

FIG. 7 is a table which illustrates the parameters in the layer 2 related to the present embodiment and their respective setting examples in representative services. Column 1 denotes the name of a sublayer of the layer 2. Column 2 denotes the ID number of a parameter allocated in an ascending order. Column 3 denotes a parameter name for each sublayer. Column 4 denotes one example of a parameter value of the layer 2 that is set for each representative communication service.

"BE" denotes best effort communication, "VoIP" denotes communication by use of an IP telephone, and "Streaming" denotes communication by means of streaming that consecutively reproduces contents such as moving images transmitted. As described above, conventionally, those parameter values are not set taking into account a change in the wireless propagation path but set statically based on each communication service. In contrast, in the present embodiment, those values are dynamically changed following a change in the wireless propagation path.

Further, in FIG. 4 and FIG. 5, reference numerals P2 and P4 to P16 of the function units correspond to the ID numbers of the parameters in FIG. 7, so that the function units perform processing based on the corresponding parameters P2 and P4 to P16 of the layer 2. Further, the parameters P1 and P3 do not relate to the function units in FIG. 4 and FIG. 5 and, therefore, are not illustrated in FIG. 4 and FIG. 5.

First, a description will be given of layer 2 parameter setting alteration operations in the wireless communication device in the present embodiment with reference to FIG. 4 and FIG. 5. Further, a description will be given in detail of the processing in each of the function units along the alteration operations.

[Layer 2 Parameter Setting Alteration Based on Change in SIR Value]

Figure 8:
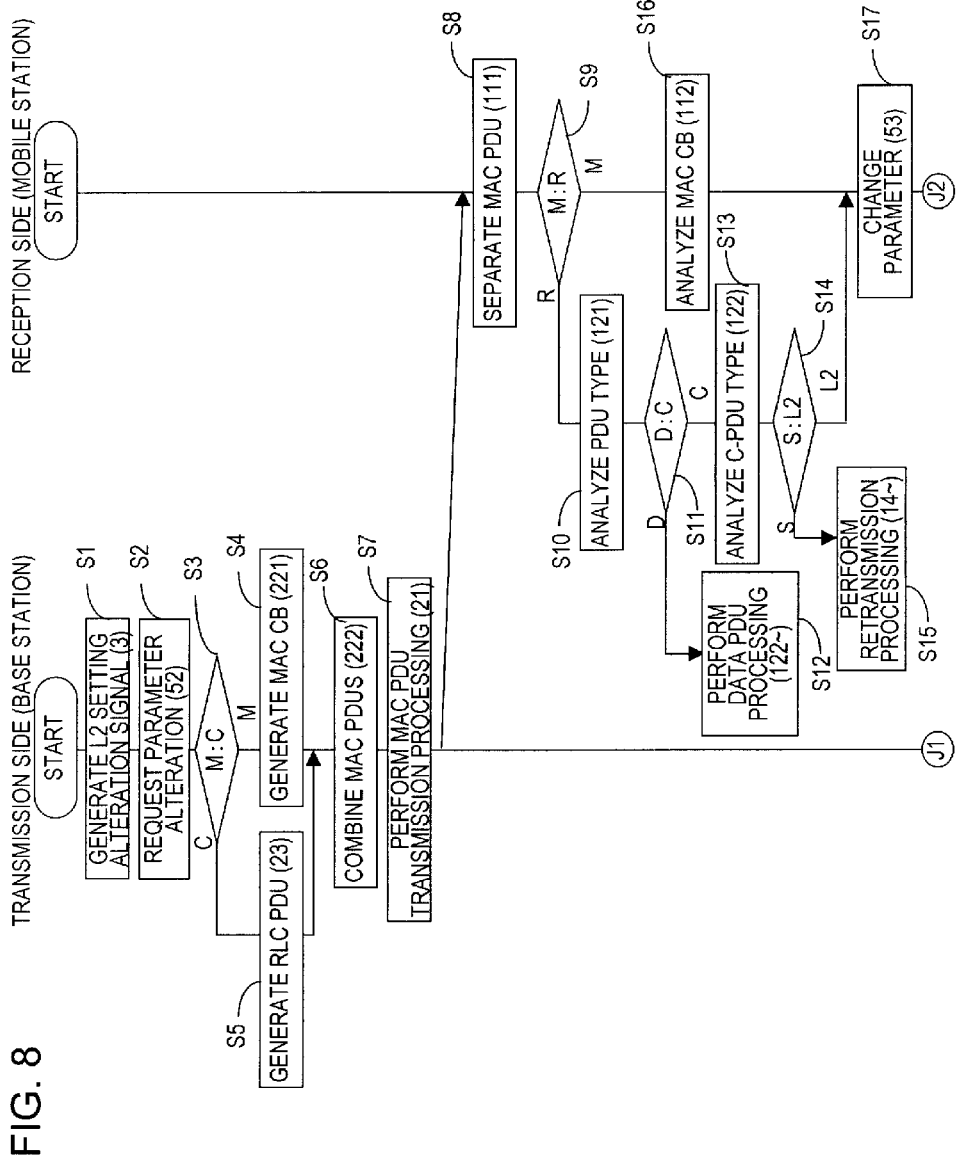
FIG. 8 is a sequence flow illustrating an anterior half of layer 2 parameter setting alteration operations based on a change in SIR value of the wireless communication device in the present embodiment.

FIG. 8 is a sequence flow which illustrates an anterior half of the layer 2 parameter setting alteration operations based on a change in SIR value of the wireless communication device in the present embodiment.

Figure 9:
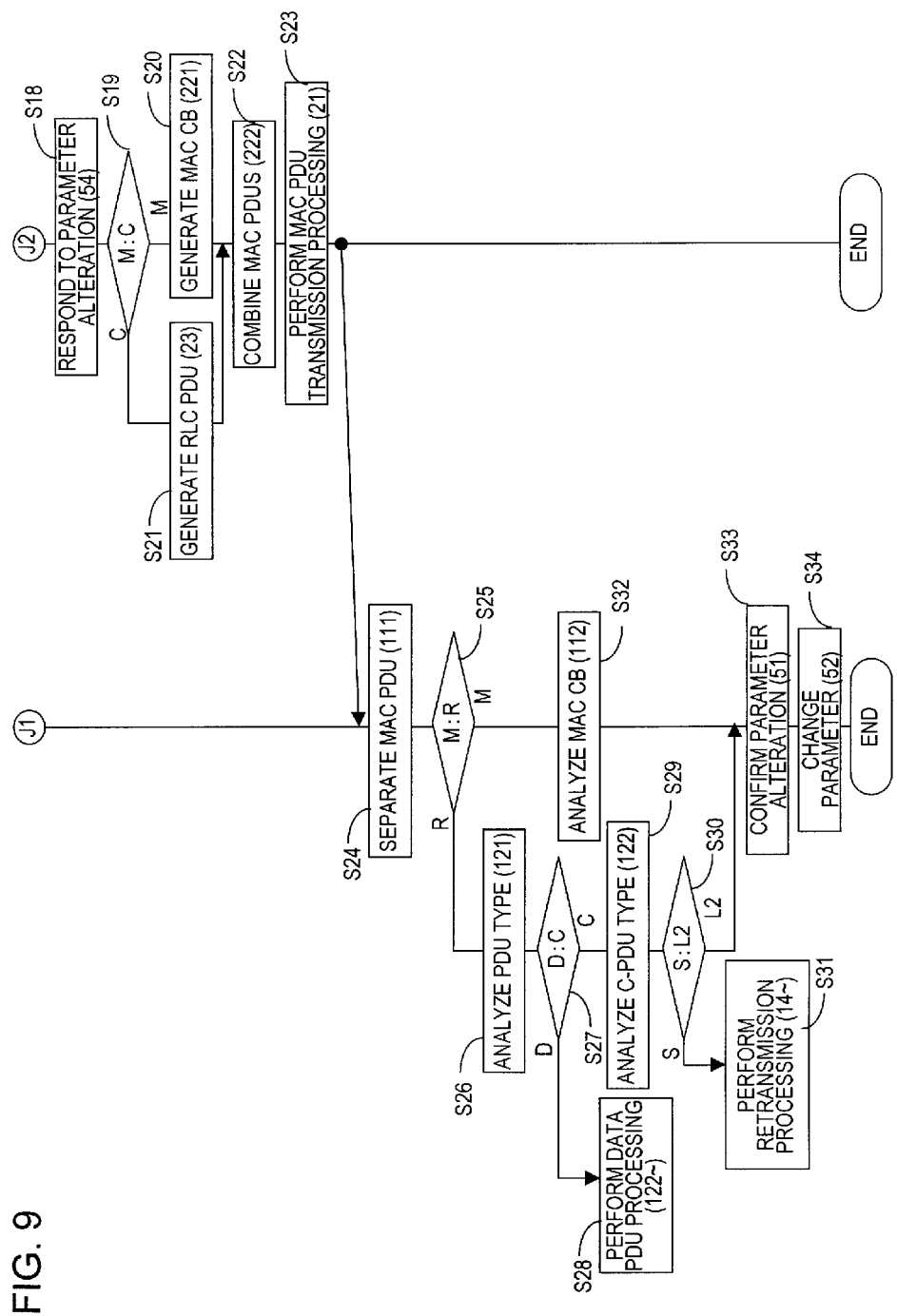
FIG. 9 is a sequence flow illustrating a last half of the layer 2 parameter setting alteration operations based on a change in SIR value of the wireless communication device in the present embodiment.

FIG. 9 is a sequence flow which illustrates a last half of the layer 2 parameter setting alteration operations based on a change in SIR value of the wireless communication device in the present embodiment. Partial flows between FIG. 8 and FIG. 9 are connected at terminals J1 and J2 respectively. Further, a numeral parenthesized in each step in FIG. 8 and FIG. 9 denotes the reference symbol of each function unit in FIG. 4 or FIG. 5 that performs the step.

The wireless communication device in the present embodiment has an SIR measurement unit (not illustrated) on the layer 1 function unit 420 (520) illustrated in FIG. 2 or FIG. 3. SIR denotes a ratio between power of a received signal with respect to an interference signal, in comparison to channel quality indication (CQI). In the present embodiment, a change in SIR value corresponds to a change in state of the wireless propagation path, so that the layer 2 parameter is dynamically changed on the basis of the change in SIR value.

The base station and the mobile station can both measure an SIR. One of those stations serves as the transmission side to determine a value of the layer 2 parameter based on an SIR measurement result and makes a request to the counterpart reception side for setting/altering the layer 2 parameter to this determined value. When having received the request, the reception side changes the layer 2 parameter in its own station. Then, after having confirmed that the layer 2 parameter has been changed on the reception side, the transmission side changes the layer 2 parameter in its own station to the same value as the reception side.

The following will describe the operations of the function units illustrated in FIG. 4 and FIG. 5 along the sequence flows illustrated in FIG. 8 and FIG. 9 respectively by assuming the base station to the transmission side which measures SIR values and requests layer 2 parameter setting alteration and the mobile station to be the reception side.

In the base station, the SIR measurement unit measures an SIR value of an inbound signal from the mobile station at prescribed timing and outputs the SIR value to the SIR detection unit 3.

The SIR detection unit 3 is a function unit that detects a change in state of e wireless propagation path and, if the SIR value received as the state of the wireless propagation path denotes a prescribed level, supplies the parameter setting alteration unit 5 with a layer 2 setting alteration signal Q that denotes a change in level of the SIR value (step S1).

A parameter setting alteration request generation unit 52 in the parameter setting alteration unit 5 determines a layer 2 parameter value that corresponds to the layer 2 setting alteration signal Q.

FIG. 10 is a table which illustrates a specific example of the parameter values in the layer 2 which are dynamically changed in the present embodiment.

FIG. 10 illustrates a specific example in the best effort communication (BE) illustrated in FIG. 7. Columns 1 to 3 in FIG. 10 are identical to columns 1 to 3 in FIG. 7 and column 4 denotes "BE" illustrated in column 4 in FIG. 7 as "conventional BE" for the purpose of comparison.

Column 5 gives levels of four stages of SIR values of "SIR>20 dB", "20 dB≥SIR>15 dB", "15 dB≥SIR>10 dB", and "10 dB≥SIR" and has the respectively corresponding layer 2 parameter values defined as parameter sets 1 to 4. The more the wireless propagation path deteriorates, the larger the corresponding parameter set number becomes. The parameter set 5 has the later-described layer 2 parameter value which is set at the time of handover.

In such a manner, those parameter sets are defined corresponding to the plurality of states of the wireless propagation path respectively and, moreover, defined for each communication service and stored in the storage unit 9 as a parameter tables. Those tables are referenced by the parameter alteration request generation unit 52 when it determines a layer 2 parameter value. The parameter tables may be stored dynamically in the storage unit 9 by an application of each communication service upon activation.

For example, if a value, measured by the base station, of the SIR of the inbound signal from the mobile station is larger than 20 dB, the layer 2 parameter values in both of the stations are set as values in the parameter set 1. Then, if the wireless state deteriorates, so that the SIR value becomes larger than 15 dB and equal to or smaller than 20 dB, the SIR detection unit 3 in the base station supplies the parameter setting alteration unit 5 with the layer 2 setting alteration signal Q that denotes that the SIR has become larger than 15 dB and equal to or smaller than 20 dB. Then, the parameter setting alteration unit 5 references the parameter tables in response to the incoming layer 2 setting alteration signal Q and determines a layer 2 parameter value to be altered in setting to a value denotes by the parameter set 2.

A re-transmission ratio and the parameter values illustrated in FIG. 10 will be detailed later.

Now, get back to FIG. 8 and FIG. 9, in which the parameter alteration request generation unit 52 in the base station makes an indication to the effect that the layer 2 parameter value on the side of the mobile station should be altered to the parameter value (parameter set) determined in the above step and generates a parameter alteration request including the determined parameter value (step S2). Based on the parameter alteration request, the mobile station changes the layer 2 parameter value of its own station.

It is possible to utilize the conventional transmission based on the communication services performed by the layer 3 function unit 440 (540) as a unit which transmits the parameter alteration request generated by the parameter alteration request generation unit 52 in the base station to the side of the mobile station.

In this case, however, information is exchanged between the layer 3 function units 440 (540) in the respective stations via their respective layer 1 and layer 2 function units 420 (520) and 430 (530) and then sent to the layer 2 function unit 430 (530) where a layer 2 parameter is set. Accordingly, a delay occurs until the layer 2 parameter setting is completed.

To solve the problem, in the first embodiment, a layer 2 parameter alteration request is transmitted between the MAC layer function units 431 (531) or the RLC layer function units 432 (532) in the layer 2 function unit 430 (530) in those two stations without passing it through the layer 3 function unit 440 (540). This scheme reduces time that elapses until the layer 2 parameter is set.

Specifically, the transmission of a parameter alteration request uses a control PDU generated in the RLC layer or an MAC control block generated in the MAC layer.

Figure 11:
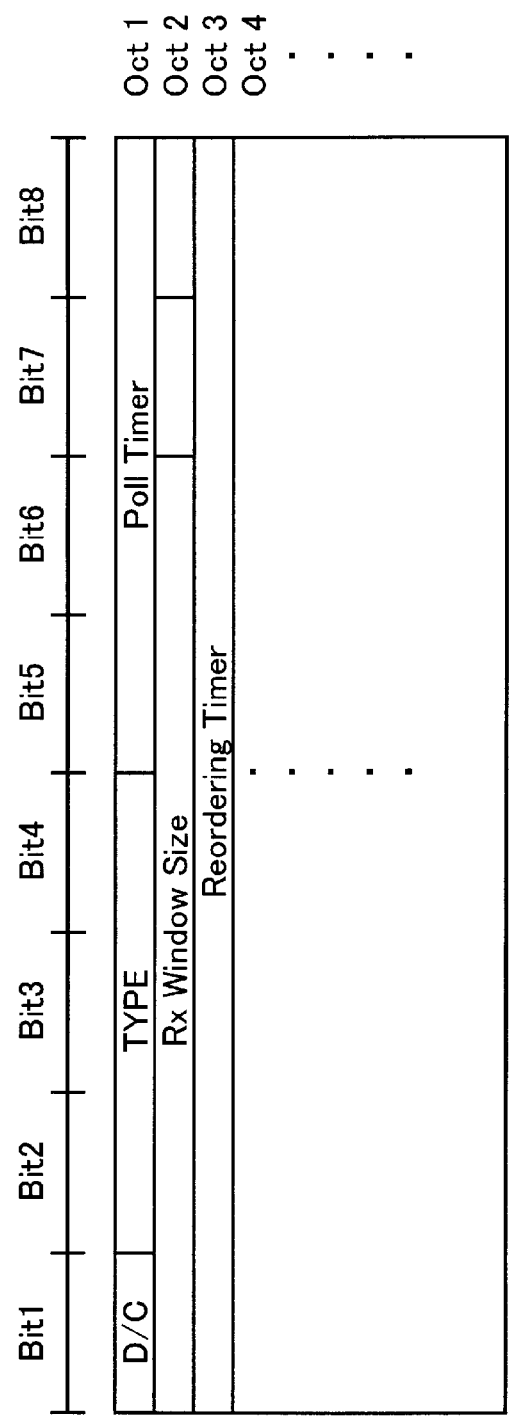
FIG. 11 is one example of a data format of a PDU which is generated in an RLC layer.

FIG. 11 is one example of a data format of the PDU which is generated in the RLC layer. "D/C" in the first bit Bit1 in the first octet Oct1 is an identifier that denotes whether a PDU is data information or control information, denoting data information if it is "0" and denoting control information if it is "1".

"TYPE" in the second bit But 2 to fourth bit Bit4 denotes the type of a PDU, for example, defining the above-described parameter alteration request if it is "000" and parameter alteration confirmation in response to the parameter alteration request if it is "001". Further, the following "Poll Timer", "Rx Window size", etc. are values specifically set as the layer 2 parameters illustrated in Column 3 in FIG. 10.

For example, the control PDU denoting the above-described parameter alteration request has "1" as "D/C" and "000" as "TYPE" and has a layer 2 parameter value which is set in the mobile station.

Further, in response to the parameter alteration request from the base station, the mobile station returns parameter alteration confirmation; the control PDU denoting the parameter alteration confirmation generated in this case has "1" as "D/C" and "001" as "TYPE" and has the layer 2 parameter value set in the mobile station.

Besides, the present embodiments uses a data PDU which is used to transmit a variety of pieces of content information such as a communication service and a status PDU denoting retransmission information such as a delivery message (ACK/NACK).

The data PDU has "0" as "D/C" and, as "TYPE", has a defined value that corresponds to the type specific to, for example, a communication service. Further, the data PDU has various kinds of content information such as a communication service.

The status PDU is one kind of the control PDU. It has "1" as "D/C" and, as "TYPE", has, for example, "010" intended to distinguish from any other control PDUs. Further, the status PDU has retransmission related information such as a delivery message (ACK/NACK).

Figure 12:
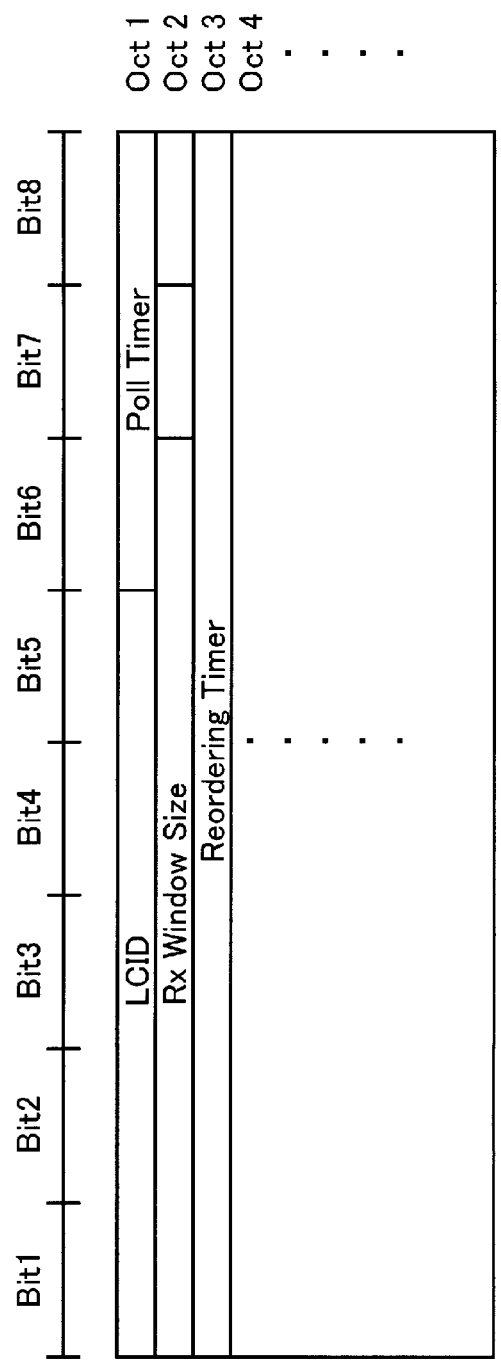
FIG. 12 is one example of the data format of an MAC control block.

FIG. 12 is one example of the data format of the MAC control block. "LCID" in the first bit Bit1 to fifth bit Bit5 in the first octet Oct1 is information identification ID. Assignment of "LCID" is discussed currently; for example, "11000" yet reserved is defined as parameter alteration request and "11001" is defined as parameter alteration confirmation. Further, as in the case of the one example of the data format of the PDU illustrated in FIG. 11, "Poll Timer", "Rx Window size", etc. come in a value that is specifically set as a layer 2 parameter.

Now, get back to FIG. 4, FIG. 5, FIG. 8, and FIG. 9, in which in the present embodiment, a parameter alteration request generated by the parameter alteration request generation unit 52 in the base station is transmitted to the mobile station in a data format of either the control PDU or the MAC control block illustrated in FIG. 11 and FIG. 12 respectively. Then, the processing shifts to the MAC control block generation unit 221 in the case of the MAC control block (M) and to the control PDU generation unit 231 in the case of the control PDU (C) (step S3).

The MAC control block generation unit 221 generates an MAC control block based on the parameter alteration request, adds header information etc. to it, and outputs it to an MAC combination unit 222 (step S4).

The control RLC generation unit 231 generates a control PDU based on the parameter alteration request. Then, an RLC PDU generation unit 23 adds header information etc. to the generated control PDU to generate an RLC PDU which is a predetermined data format processed by the RLC function unit 432 (532) illustrated in FIG. 6, and outputs it to the MAC combination unit 222 (step S5).

The MAC PDU combination unit 222 combines the RLC PDUs received from the plurality of channels. For example, in transmission of various kinds of content information such as a communication service, a plurality of data PDUs are output from an RLC retransmission control unit 28 and a plurality of RLC PDUs to which header information etc. are added are input via the RLC PDU generation unit 23 to the MAC PDU combination unit 222.

Moreover, those processing pieces are multiplexed and performed through the plurality of channels concurrently. The description of "LCN=n" input to the MAC PDU combination unit 222 in FIG. 5 denotes that aspect in that the RLC PDUs generated through the plurality of channels are input to the MAC PDU combination unit 222.

The MAC PDU combination unit 222 combines an RLC PDU or an MAC control block which denotes a layer 2 parameter alteration request as illustrated in FIG. 6 with any other RLC PDU to generate a MAC PDU which is a predetermined data format processed by the MAC function unit 431 (531) (step S6).

An MAC PDU retransmission unit 21 temporarily saves the MAC PDU generated by the MAC PDU combination unit 222 in a retransmission buffer 211 and, further, outputs the MAC PDU to the layer 1 function unit 520 (step S7).

Then, the MAC PDU including the RLC PDU or MAC control block denoting the parameter alteration request is transmitted as transmission data to the mobile station via the layer 1 function unit 520. The mobile station performs predetermined processing on the received data in the layer 1 function unit 420, so that the MAC PDU including the RLC PDU or MAC control block denoting a parameter alteration request generated in the base station is input to an MAC PDU separation unit 111.

The MAC PDU separation unit 111 in the mobile station separates the received MAC PDU into a plurality of RLC PDUs as illustrated in FIG. 6 (step S8). Then, those RLC PDUs(R) are output to a PDU type analysis unit 121. Further, if the received MAC PDU includes an MAC control block (M) denoting a parameter alteration request, the MAC PDU separation unit 111 outputs the MAC control block (M) to an MAC control block analysis unit 112 (step S9).

Further, pieces of the processing following that performed by the PDU type analysis unit 121 are multiplexed similar to the multiplication described on the MAC PDU combination unit 222. That is, the plurality of RLC PDUs separated from each other are output to the PDU type analysis units 121 in the plurality of channels and then processed concurrently. The description of "LCN=n" output from the MAC PDU separation unit 111 in FIG. 4 denotes that aspect in that the plurality of RLC PDUs separated from each other by the MAC PDU separation unit 111 are output to the PDU type analysis unit 121 in each of the channels.

The PDU type analysis unit 121 decides whether the received RLC PDU denotes a control PDU or a data PDU. In the decision, the PDU type analysis unit 121 references "D/C" in the first bit Bit1 in the first octet Oct1 given in the PDU data format in FIG. 11.

If "D/C" is "1", it is decided that the RLC PDU is a control PDU(C), so that the processing shifts to a control PDU type analysis unit 122. If "D/C" is "0", it is decided that the RLC PDU is a data PDU(D), so that the processing shifts to a poll check unit 13 (steps S10 and S11). The pieces of processing (step S12) following that performed by the poll check unit 13 in the case of the data PDU will be described later.

The control PDU type analysis unit 122 decides whether the received RLC PDU (control PDU) is a control PDU denoting a parameter alteration request or a status PDU denoting a data re-transmission request. In the decision, the control PDU type analysis unit 122 references "TYPE" in the second bit Bit2 to the fourth bit Bit4 given in the PDU data format in FIG. 11.

If "TYPE" is "000", it is decided that the control PDU is a control PDU(L2) denoting a parameter alteration request, so that the processing shifts to the parameter alteration request analysis unit 53. If "TYPE" is "010", it is decided that the control PDU is a status PDU(S) denoting a data retransmission request, so that the processing shifts to an ACK/NACK analysis unit 14 (steps S13 and S14). The pieces of processing (step S15) following that performed by the ACK/NACK analysis unit 14 in the case of the status PDU will be described later.

The MAC control block analysis unit 112 decides whether the received MAC control block denotes a parameter alteration request or any other processing request etc. In the decision, the MAC control block analysis unit 112 references "LCID" in the first bit Bit1 to the fifth bit Bit5 in the first octet Oct1 of the MAC control block given in the data format in FIG. 12.

If "LCID" is "11000", it is decided that the MAC control block denotes a parameter alteration request, so that the processing shifts to a parameter alteration request analysis unit 53 (step S16). Besides the processing, for example, "11111" as "LCID" is assigned "Padding" processing. If "11111" is detected as "LCID" is detected by the MAC control block analysis unit 112, the processing shifts to the "Padding" processing, not illustrated.

The parameter alteration request analysis unit 53 a layer 2 parameter L2P to a parameter value in the layer 2 denoted by the received control PDU or MAC control block (step S17).

A parameter alteration confirmation generation unit 54 generates a parameter alteration confirmation to the effect that the layer 2 parameter value of its own station has been changed to the parameter value requested (step S18).

The parameter alteration confirmation is generated in the data format of either the control PDU(C) or the MAC control block (M) as in the case of step S3 (step S19).

As described above, "TYPE" in the control PDU denoting a parameter alteration confirmation is "001" and "LCID" in the MAC control block is "11001".

Hereinafter, in processing in steps S20 to S23 in the mobile station, almost the same processing as that performed on the parameter alteration request in steps S4 to S7 is performed on the parameter alteration confirmation.

Then, the MAC PDU including the RLC PDU or MAC control block denoting the parameter alteration confirmation is transmitted as transmission data to the base station via the layer 1 function unit 420. The base station performs predetermined processing on the received data in its layer 1 function unit 520, so that the MAC PDU including the RLC PDU or MAC control block denoting the parameter alteration confirmation generated in the mobile station is input to the MAC PDU separation unit 111.

Hereinafter, in processing in steps S24 to S32 in the base station, almost the same processing as that performed in steps S8 to S16 is performed on the MAC PDU including the RLC PDU or MAC control block denoting the parameter alteration confirmation input to the MAC PDU separation unit 111.

However, the RLC PDU or MAC control block denoting the parameter alteration confirmation has its "TYPE" denoting "001" according to the decision by the control type PDU analysis unit 122 and its "LCID" denoting "11001" according to the decision by the MAC control block analysis unit 112. After those decisions, the processing shifts to a parameter alteration confirmation check unit 51.

The parameter alteration confirmation check unit 51 checks the parameter alteration confirmation denoted by the input control PDU or MAC control block (step S33).

The parameter alteration confirmation check unit 51 checks that the setting on the reception side has been performed as requested on the basis of the check by the parameter alteration confirmation check unit 51 and then changes its own station's layer 2 parameter value L2P so that it may match the reception side (step S34).

In such a manner, in response to a change in state of the wireless propagation path, layer 2 parameter setting is changed in each of the base station and the mobile station. Further, in the setting, first a parameter on the mobile station side has been set and, after the setting is confirmed, a parameter on the base station side has been set; however, the parameter on the mobile station side may be set after setting on the base station side.

That is, if the state of the wireless propagation path changes, the base station determines the corresponding parameter set and changes its own station's layer 2 parameter to a value denoted by the determined parameter set and then transmits a parameter alteration request to the mobile station. The mobile station in turn changes its own station's parameter based on the parameter alteration request and, to confirm it, transmits a parameter alteration confirmation to the base station.

Next, a description will be given in detail of the function units involved in the layer 2 parameters in accordance with the operations to transmit/receive service information etc.

[Transmission/Reception of Service Information etc.]

Figure 13:
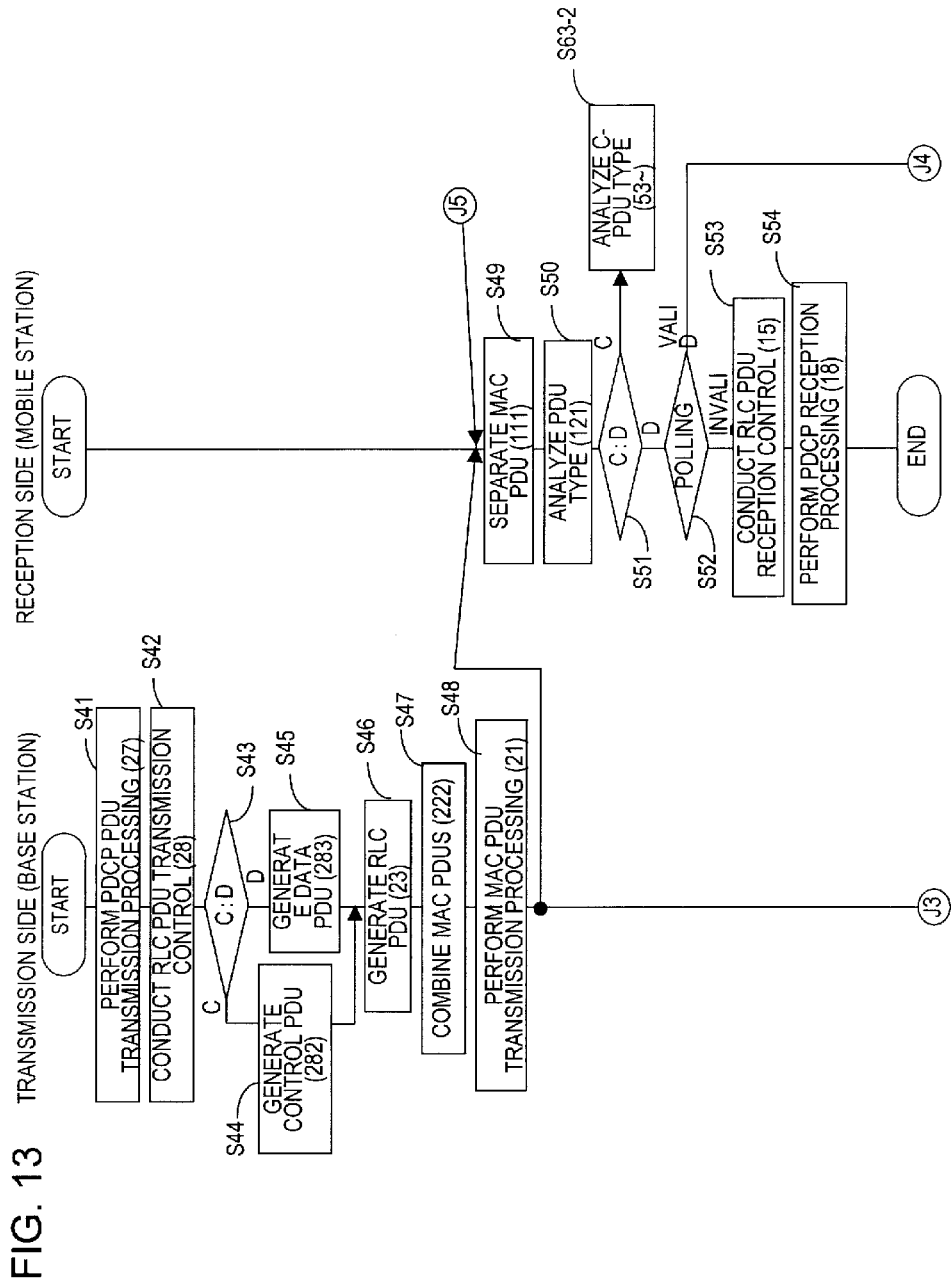
FIG. 13 is a sequence flow illustrating transmission/reception of service information etc. in the wireless communication device in the present embodiment.

FIG. 13 is a sequence flow showing transmission/reception of service information etc. in the wireless communication device in the present embodiment.

Figure 14:
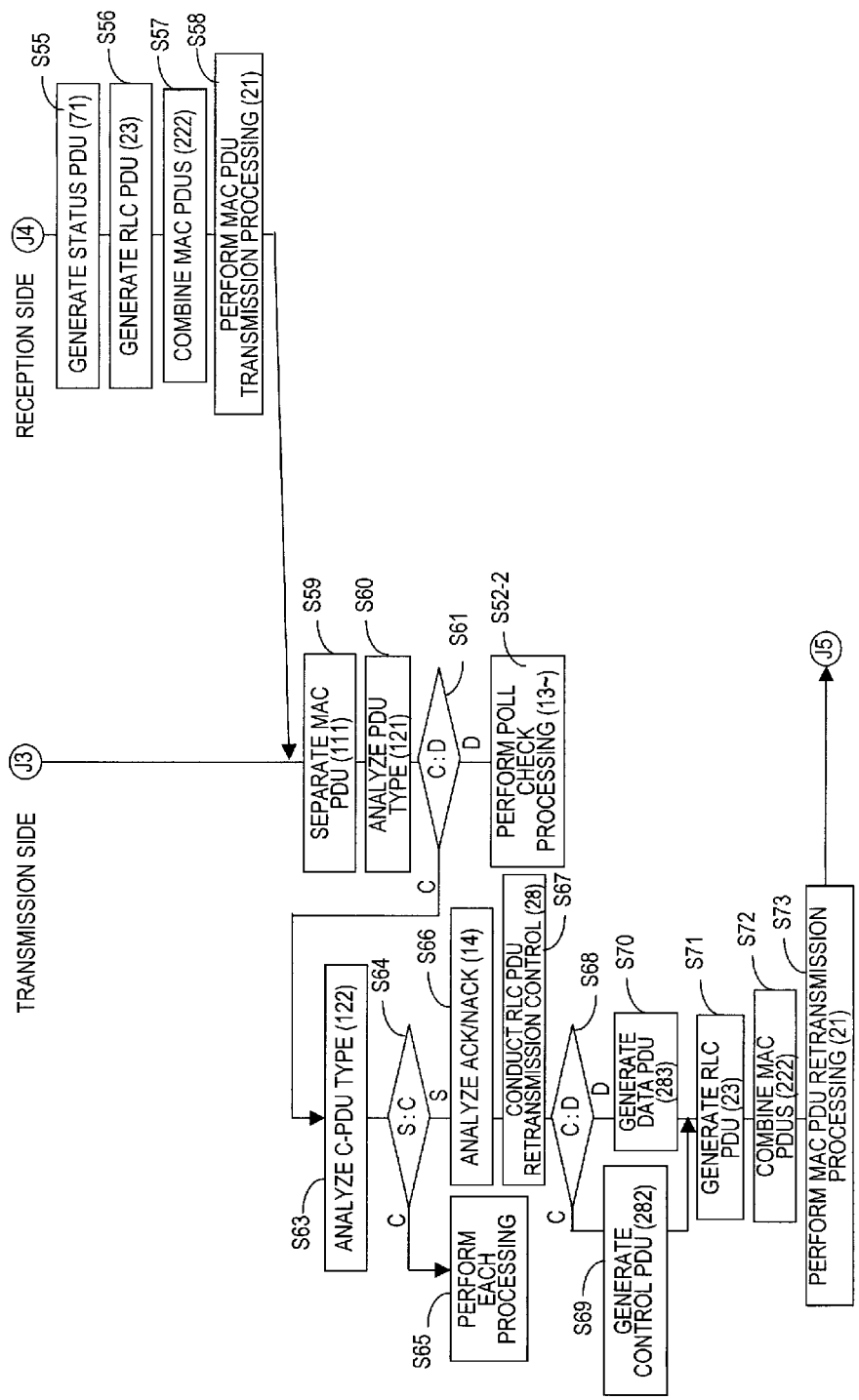
FIG. 14 is a sequence flow illustrating retransmission control by use of an automatic repeat request (ARQ) in the transmission/reception in FIG. 13.

FIG. 14 is a sequence flow showing retransmission control by use of an automatic repeat request (ARQ) in the transmission/reception in FIG. 13. Partial flows between FIG. 13 and FIG. 14 are connected at terminals J3, J4, and J5 respectively. Further, a numeral parenthesized in each step denotes the reference symbol of each function unit in FIG. 4 or FIG. 5 that performs the step.

Transmission/reception of service information etc. is performed in much the same way on both of the base station side and the mobile station side. In the following description, the base station is assumed to be the transmission side and the mobile station, to be the reception side.

In transmission/reception of service information etc., the layer 2 transmission unit 2 in the base station performs transmission processing on transmission information. Then, the layer 2 reception unit 1 in the mobile station performs reception processing on the received information. Moreover, if proper information could not be received by the mobile station owing to a transmission error, retransmission control by use of an ARQ is conducted.

The ARQ is an automatic error control method to achieve data communication with high reliabilities. If having received information properly, the mobile station returns a delivery confirmation message (ACK) to the base station, and if not having received data properly owing to a transmission error, it returns a non-delivery confirmation message (NACK) to the base station. If having received "NACK" if not having received "ACK" within a prescribed lapse of time, the base station retransmits the corresponding same data. It repeats the retransmission until it receives "ACK" or the number of times of the retransmission reaches a prescribed value.

In transmission/reception of service information etc., a PDCP transmission processing unit 27 in the base station receives information pieces based on a communication service from the higher-order layer function unit 440, temporarily saves those information pieces in an SDU buffer 271, and outputs them appropriately to the RLC PDU retransmission control unit 28 (step S41).

The RLC PDU retransmission control unit 28 temporarily saves the information received from the PDCP transmission processing unit 27 in a retransmission buffer 26. Moreover, the RLC PDU retransmission control unit 28 appropriately reads (copies) transmission information among the information pieces saved in the retransmission buffer 26 in a reassembly buffer 281 and adds management information to it.

Then, a control PDU(C) denoting data control information or a data PDU(D) denoting data information is generated depending on contents of the information (steps S42 to S45). As illustrated in the PDU data format in FIG. 11, in the case of a control PDU, "D/C" is set to "1", and in the case of a data PDU, "D/C" is set to "0".

The control PDU(C) denoting the data control information generated in such a manner depends on, for example, the various contents, so that in contrast to the PDU denoting a parameter alteration request or the status PDU described above, "TYPE" given in the PDU data format in FIG. 11 has its own value defined in it.

A buffer monitor unit 25 monitors the amount of information accumulated in the retransmission buffer 26 and outputs the accumulated amount to a polling management unit 24. Further, the buffer monitor unit 25 prescribes an upper limit of the accumulated amount of information in the retransmission buffer 26.

The polling management unit 24, present in the base station, manages polling to ask the mobile station whether it has a transmission request to the base station. Polling is performed either periodically at prescribed timing or based on an accumulation ratio of the retransmission buffer 26 supplied from the buffer monitor unit 25 described above. If those polling conditions occur, the polling management unit 24 outputs a polling request to the RLC PDU generation unit 23.

The RLC PDU generation unit 23 adds header information etc. to the control PDU or data PDU generated by the RLC PDU retransmission control unit 28, to generate an RLC PDU which is the prescribed data format illustrated in FIG. 6. Further, if a polling request is generated from the polling management unit 24, a polling bit in the RLC PDU header information is made "VALID" (step S46). When having received the RLC PDU in which the polling bit is "VALID", the mobile station returns to the base station a status PDU having retransmission related information such as "ACK/NACK" based on the functions of the later-described poll check unit 13 and retransmission request control unit 7.

The MAC PDU combination unit 222 combines the RLC PDUs received from the plurality of channels, to generate an MAC PDU which is a predetermined data format (step S47). As described above, the pieces of processing up to the generation of the RLC PDU in step S46 are multiplexed and, therefore, performed through the plurality of channels concurrently.

The MAC PDU retransmission control unit 21 temporarily saves the MAC PDU generated by the MAC PDU combination unit 222 in the retransmission buffer 211 and, moreover, outputs the MAC PDU to the layer 1 function unit 520 (step S48).

Then, the MAC PDU having the information based on the communication service is transmitted as transmission data to the mobile station via the layer 1 function unit 520. The mobile station performs prescribed processing on the received data in its layer 1 function unit 420, so that the MAC PDU having the information based on the communication service generated in the base station is input to the MAC PDU separation unit 111.

The MAC PDU separation unit 111 separates the received MAC PDU into a plurality of RLC PDUs as illustrated in FIG. 6 and outputs those RLC PDUs to the PDU type analysis unit 121 (step S49). As described above, the pieces of processing following that performed by the PDU type analysis unit 121 are multiplexed.

The PDU type analysis unit 121 decides whether the received RLC PDUs denote a control PDU or a data PDU. In the decision, the PDU type analysis unit 121 references "D/C" in the first bit Bit1 in the first octet Oct1 illustrated in the PDU data format in FIG. 11.

Then, if "D/C" is "1", it is decided that the RLC PDU is a control PDU(C), so that the processing shifts to the control PDU type analysis unit 122. If "D/C" is "0", it is decided that the RLC PDU is a data PDU(D), so that the processing shifts to the poll check unit 13 (steps S50 and S51).

The control PDU type analysis unit 122 references "TYPE" given in the data format in FIG. 11 in the received RLC PDU (control PDU), to detect a control PDU denoting data control information that depends on the various types of contents described above. Then, the processing shifts to the function unit (not illustrated) that performs processing that corresponds to this control PDU (step S63-2).

The poll check unit 13 references the polling bit in the received RLC PDU (data PDU) to check whether polling is asked by the transmission side (step S53). If polling is "INVALID", the processing shifts to an RLC PDU reception control unit 15. If polling is "VALID", the processing shifts to the retransmission request control unit 7.

The RLC PDU reception control unit 15 temporarily saves the received RLC PDU in a reordering buffer 161. Further, the information pieces sent from the transmission side are not always arrive in the correct order and, therefore, are reordered by the RLC PDU reception control unit 15 (reordering).

Moreover, the RLC PDU reception control unit 15 appropriately reads (copies) the information saved in the reordering buffer 161 into a reassembly buffer 162, adds management information to it, and outputs it as a PDCP PDU to a PDCP reception processing unit 18 appropriately (step S53).

A buffer monitor unit 17 monitors the amount of information accumulated in the reordering buffer 161. Further, the buffer monitor unit 17 references a sequence number and an octet number of the RLC PDUs accumulated in the reordering buffer 161, to detect an RLC PDU yet to arrive as missing information or an RLC PDU not properly received. Moreover, the buffer monitor unit 17 prescribes an upper limit of the accumulated amount of information in the reordering buffer 161.

The PDCP reception processing unit 18 processes the received PDCP PDU and outputs an IP packet to the higher-order layer function unit 440 (step S54).

If polling is "VALID" back in step S52, the processing shifts to the retransmission request control unit 7.

The following processing is retransmission control by use of an ARQ.

The retransmission request control unit 7 is a function unit related to retransmission control in the mobile station. In response to detection of polling in the poll check unit 13, the retransmission request control unit 7 in the mobile station generates an ACK/NACK list intended to cause the base station to retransmit the information, based on the missing information detected by the buffer monitor unit 17 described above. Then, a status PDU generation unit 71 generates a status PDU having the generated ACK/NACK list and information related to and other retransmission and outputs them to the RLC PDU generation unit 23 (step S55).

The following processing in steps S56 to S58 in the mobile station is almost the same as the above-described processing in S46 to S48 in the base station. The status PDU is transmitted as an MAC PDU including the status PDU to the base station side via the layer 1 function unit 420 and input as MAC PDU including the status PDU to the MAC PDU separation unit 111 on the base station side.

The status PDU has "D/C" given in the data format in FIG. 11 set to "1" and is classified as one of the control PDU(C), so that the received status PDU is input to the control PDU type analysis unit 122 via the MAC PDU separation unit 111 and the PDU type analysis unit 121 (steps S59 to S61). The base station, which is the transmission side, does not perform the processing after step S52-2.

The control PDU type analysis unit 122 decides whether the received RLC PDU (control PDU) denotes a data retransmission request (status PDU(S)) or any other control PDU(C) (step S63). The other control PDU(C) refers to any other control PDU that denotes data control information that depends on, for example, contents.

In the decision, "TYPE" given in the data format in FIG. 11, so that if the received control PDU is a status PDU(S), the processing shifts to the ACK/NACK analysis unit 14 (step S64). If the received control PDU is any other control PDU (C), the processing shifts to the function unit (not illustrated) that performs processing corresponding to the control PDU (step S65).

The ACK/NACK analysis unit 14 is a function unit that is paired with the retransmission request control unit 7 and related to retransmission control in the base station. The ACK/NACK analysis unit 14 references a status PDU's ACK/NACK list from the mobile station, to detect whether the information already transmitted is delivered properly to the mobile station. If "NACK" is detected from the ACK/NACK list, the ACK/NACK analysis unit 14 requests the RLC PDU retransmission control unit 2 to re-transmit information corresponding to "NACK" to the mobile station (step S66).

The RLC PDU retransmission control unit 28 retransmits information corresponding to the "NACK"-specified information in response to the request from the ACK/NACK analysis unit 14 (step S67). As described above, the retransmission buffer 26 temporarily saves the information transmitted from the layer 2 transmission unit 2.

Accordingly, the RLC PDU retransmission control unit 28 references the retransmission buffer 26 to appropriately read (copy) retransmission information corresponding to "NACK" into the reassembly buffer 281 and adds management information to it. Then, it generates a control PDU(C) denoting data control information or a data PDU(D) denoting data information depending on contents of the information. Further, the RLC PDU retransmission control unit 28 erases the information corresponding to "ACK" from the retransmission buffer 26, thereby releasing the buffer.

Hereinafter, the processing in steps S68 to S73 in the base station is almost the same as the above-described processing in steps S43 to S48 in the base station in that retransmission information is output as an MAC PDU to the layer 1 function unit 520 and transmitted to the mobile station.

Now, a description will be given of retransmission control by use of an ARQ and information to be retransmitted.

Figure 15:
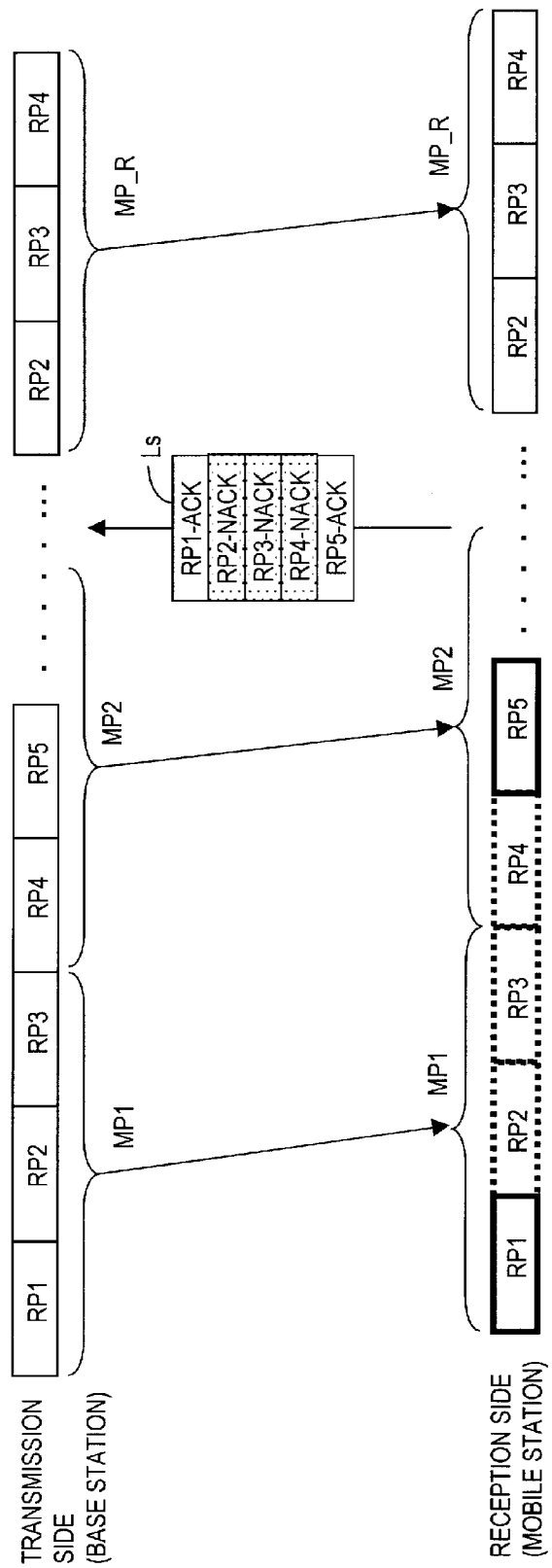
FIG. 15 is a conceptual diagram of retransmission processing between the side of transmission (base station) and the side of reception (mobile station)

FIG. 15 is a conceptual diagram of retransmission processing between the side of transmission (base station) and the side of reception (mobile station). RLC PDUs (RP1, RP2, . . . ) generated by the RLC function unit 532 in the base station are combined by the MAC function unit 531 and retransmitted to the mobile station as MAC PDUs (MP1, MP2, . . . ). FIG. 15 shows a case where the mobile station could not properly receive RLC PDUs (RP2, RP3, and RP4) due to a transmission error that occurred on the wireless propagation path between the base station and the mobile station. In response to polling from the base station, the mobile station returns an ACK/NACK list Ls to the base station.

For example, "RP1-ACK" in the ACK/NACK list Ls denotes that the RLC PDU(RP1) is properly received by the mobile station, and "RP2-NACK" in it denotes that the RLC PDU(RP2) is not properly received by the mobile station. The ACK/NACK analysis unit 14 in the base station analyzes the ACK/NACK list Ls. Based on a result of the analysis, the RLC PDU retransmission control unit 28 in the base station appropriately reads (copies) information corresponding to "NACK" from the retransmission buffer 26 into the reassembly buffer 281, adds management information to it, and outputs it to the RLC PDU generation unit 23. The RLC PDU generation unit 23 adds header information etc. to it to generate RLC PDUs (RP2, RP3, and RP4). Then, they are transmitted as an MAC PDU(MR_R) to the mobile station. Further, the RLC PDU retransmission control unit 28 in the base station erases information of RLC PDUs (RP1, RP5) corresponding to "ACK" from the retransmission buffer 26, thereby releasing the buffer.

If the wireless propagation path deteriorates, a transmission error occurs to perform the above-described retransmission control by use of an ARQ is conducted; however, the retransmitted information also encounters a transmission error highly possibly. Further, generally, the longer the transmission data is, the more the transmission error occurs. To solve the problem, in retransmission control by use of an ARQ, information to be retransmitted is divided into information pieces each having a short data length so that the divided information pieces may each be retransmitted.

The following will describe retransmission of the divided information pieces.

Figure 16:
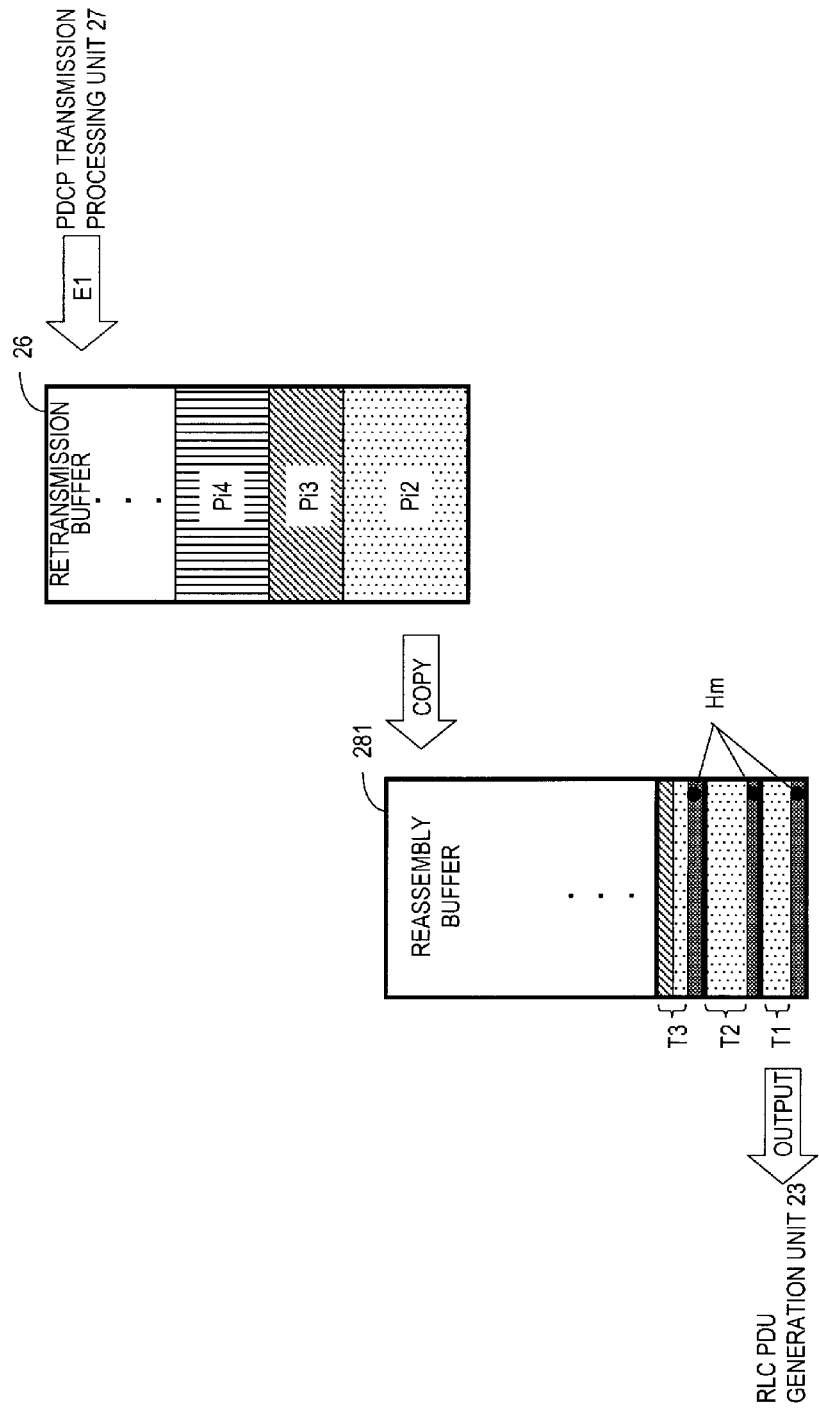
FIG. 16 is a diagram illustrating processing of information in a retransmission buffer 26 and a reassembly buffer 281 in FIG. 5.

FIG. 16 is a diagram showing processing of information in the retransmission buffer 26 and the reassembly buffer 281 in FIG. 5.

Figure 17:
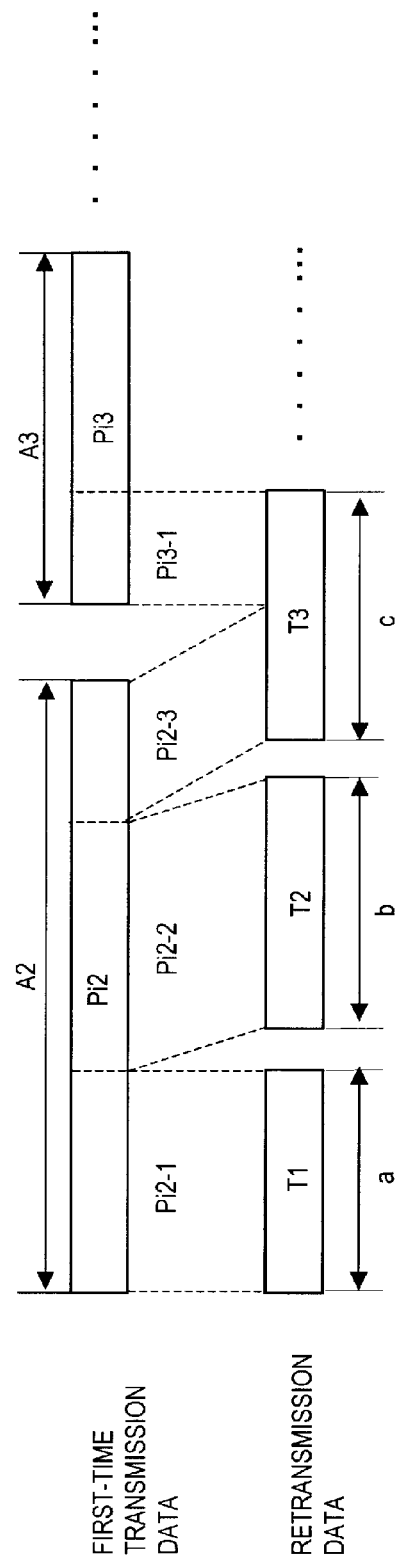
FIG. 17 is a diagram illustrating division of information in a case where the information of retransmitted.

FIG. 17 is a diagram showing division of information in a case where the information of retransmitted. In FIG. 16, transmission information E1 which is input from the PDCP transmission processing unit 27 is temporarily saved in the retransmission buffer 26. Those information pieces, if to be transmitted for the first time, are appropriately read (copied) into the reassembly buffer 281, where management information is added to each of the read information pieces. Then, a control PDU or a data PDU is generated on the basis of those information pieces and output to the RLC PDU generation unit 23.

Information pieces Pi2, Pi3, and Pi4 accumulated in the retransmission buffer 26 in FIG. 16 are included in the RLC PDUs (RP2, RP3, and RP4) for which "NACK" is returned in FIG. 15 and to be retransmitted to the mobile station.

Further, the information pieces Pi2, Pi3, . . . that correspond to FIG. 16 are illustrated in FIG. 17. The information piece Pi2 having a data length A2 is read (copied) as it is into the reassembly buffer 281 at the time of first transmission, has the management information added to it, and is transmitted to the mobile station as the RLC PDU(RP2) illustrated in FIG. 15. Similarly, the information piece Pi3 having a data length A3 is transmitted as the RLC PDU(RP3).

However, in the case of retransmission, as described above, to avoid a transmission error, the information Pi2 read in the reassembly buffer 281 is divided into data lengths Pi2-1, Pi2-2, and Pi2-3. Further, the information Pi3 is also divided similarly. Then, as illustrated in FIG. 17, information pieces T1, T2, T3, . . . that have data lengths a, b, c, . . . shorter than the information pieces A2 and A3 transmitted first are generated. Those data lengths a, b, c, . . . are set to match the state of the wireless propagation path.

The thus divided information pieces T1, T2, T3, . . . need to be managed in a consolidated manner, so that management information Hm is added to each of them in the reassembly buffer 281 as illustrated in FIG. 16. Then, an RLC PDU having a data length shorter than the first-transmitted information is transmitted to the mobile station.

Further, the information pieces transmitted from the base station in condition where they are divided from each other are temporarily saved in the reordering buffer 161 in the mobile station and appropriately read into the reassembly buffer 162 and recombined.

In such a manner, in the case of retransmission control by use of an ARQ, the base station divides information to be transmitted first, which divided information pieces are combined in the mobile station, so that processing loads and time increase in both of the stations. Moreover, the management information Hm is added to each of the divided information pieces, thereby increasing information transfer loads as well as the processing loads and time for information management.

As described above, in transmission/reception of service information etc., if the wireless propagation path deteriorates, a problem occurs in terms of increased processing loads and delay owing to retransmission. To solve the problem, the present embodiment dynamically changes layer 2 parameter values according to the wireless propagation path.

The following will describe an example of setting the layer 2 parameters and the resultant effects in transmission/reception with reference to the specific example of the best effort communication (BE) illustrated in FIG. 10 for each of the functions.

[Effects of Changes in Layer 2 Parameters in Transmission/Reception]

As described above, the ID numbers denoted in Column 2 in FIG. 10 correspond to the symbols of the parameters P2 and P4 to P16 related to the function units illustrated in FIG. 4 and FIG. 5.

The parameters P1, P2, and P14 are related to forwarding processing at the time of handover and not changed corresponding to a change in the wireless propagation path and, therefore, will be described in the paragraph of layer 2 setting alteration at the time of handover to be described later.

The parameter p3 (RLC mode) denotes a data transfer method based on a communication service. "AM" denotes "confirmation type data transfer", "UM" denotes "non-confirmation type data transfer", and "TM" denotes "transmission type data transfer". In the present embodiment illustrated in FIG. 10, the best effort communication (BE) is set to "AM" and constant irrespective of a change in SIR.

The buffer monitor unit 25 prescribes the upper limit (buffer size) of the information accumulation capacity of the retransmission buffer 26 based on a value set to the parameter P5 (Tx Window size). If the wireless propagation path deteriorates, the above-described retransmission by use of an ARQ is performed; however, information to be retransmitted stagnates in the retransmission buffer 26 until it is properly transmitted to the mobile station. Accordingly, if the wireless propagation path deteriorates, the retransmission buffer 26 may possibly be filled with the stagnant information.

Therefore, all the information stagnant in the retransmission buffer 26 undergoes division processing in the reassembly buffer 281 as illustrated in FIG. 16. That is, in a case where the retransmission buffer 26 is filled with stagnant information, the larger the buffer size is, the more the loads and time increase in division processing. Moreover, the management information Hm is added to each of the divided information pieces, so that the larger buffer involves the larger amount of information transferred between the two stations.

To cope with such an increase in processing load etc., if the wireless propagation path deteriorates, the parameter P5 (Tx Window size) should preferably be set smaller to reduce the buffer size of the retransmission buffer 26.

In the present embodiment, as illustrated in FIG. 10, if the SIR value becomes 15 dB or less, the parameter P5 is changed from "128" to "64". This halves the buffer size of the retransmission buffer 26. Therefore, if, for example, the retransmission buffer 26 is filled with stagnant information, the loads and time necessary in the division processing are halved.

Further, if the retransmission buffer 26 is filled with stagnant information, entry of new transmission information from the PDCP transmission processing unit 27 into the retransmission buffer 26 is inhibited through flow control. Further, if the state of the wireless propagation path recovers to conversely change the parameter P5 from "64" to "128", the buffer size doubles to secure a free space in the buffer, so that new transmission information is input into the retransmission buffer 26 early and so undergoes the transmission processing. That is, by this change, the performance of following the state of the wireless propagation path is improved.

The polling management unit 24 transmits polling based on such parameters P6 (Window based polling), parameter P7 (Poll Window), parameter P8 (Poll Timer), parameter P9 (Poll_prohibit Timer), and parameter P10 (poll prohibit).

In response to polling from the base station, the mobile station returns a status PDU including the ACK/NACK list to the base station. The base station in turn retransmits information corresponding to "NACK" based on the ACK/NACK list. As described above, retransmission control by use of an ARQ leads to an increase in processing load etc., so that if the wireless propagation path deteriorates, it is preferable to reduce a polling frequency.

However, to erase information stagnant in the retransmission buffer 26, it is necessary to transmit polling, so that "ACK" needs to be detected in the ACK/NACK list obtained in response to the polling. Therefore, in a case where the wireless propagation path deteriorates, if the polling frequency is reduced excessively, the information stagnant in the retransmission buffer 26 may not be erased, thereby increasing the processing loads etc. instead.

The polling management unit 24 is supplied by the buffer monitor unit 25 with the accumulation ratio of information accumulated in the retransmission buffer 26. Further, the parameter P7 has an upper limit of the accumulation ratio set in it. The polling management unit 24 transmits polling if the accumulation ratio of the information in the retransmission buffer 26 reaches its upper limit denoted by the parameter P7. Further, to the parameter P6, an "ON" or "OFF" value is set that respectively validates or invalidates the transmission of polling based on the accumulation ratio.

In the present embodiment, if the SIR value becomes 15 dB or less, the parameter P6 is changed from "OFF" to "ON" and the parameter P7 is changed to "50". That is, if the wireless communication environment is good, the information stagnates less in the retransmission buffer 26, so that polling based on the accumulation ratio is not transmitted. If the wireless communication environment deteriorates, polling is transmitted at a point in time when the accumulation ratio of the retransmission buffer 26 reaches 50%, in order to erase the information stagnant in the retransmission buffer 26 early.

To the parameter P8, a time interval at which to transmit polling is set. In the present embodiment, the more the SIR value deteriorates, the larger the value of the parameter P8 is set. That is, if the wireless propagation path deteriorates, the polling frequency is reduced.

In such a manner, polling is transmitted on the basis of the accumulation of information in the retransmission buffer 26 or the lapse of a constant time interval. If polling is transmitted due to any one of those factors, a lapse of time until the next polling is transmitted is set to the parameter P9.

That is, until the lapse of time set to the parameter P9 elapses after polling is transmitted, no polling is transmitted even if any conditions for polling transmission occur. Further, to the parameter P10, an "ON" or "OFF" value is set that respectively validates or invalidates the setting of the parameter P9.

In the present embodiment, if the SIR value becomes 15 dB or less, the parameter P10 is changed from "OFF" to "ON", and the parameter P9 is set larger as the wireless propagation path deteriorates more. If the SIR value is larger than 15 dB, polling based on the accumulation ratio of information in the retransmission buffer 26 is not transmitted because the parameter 6 is set to "OFF".

That is, only polling at a constant time interval is performed, so that correspondingly the parameter P10 is set to "OFF". Only if the SIR value is 15 dB or less, polling is transmitted because of either the condition of the accumulation ratio of the condition of the information in the retransmission buffer 26 or the constant lapse of time because the parameter 6 is set to "ON".

If the SIR value is 15 dB or less, to avoid an increase in processing load because of polling transmitted at a short cycle owing to the occurrence of any of the conditions, the value of the parameter P9 is set to "80 ms" or "100 ms" to match the wireless propagation path.

In response to polling, the retransmission request control unit 7 returns a status PDU having the ACK/NACK list based on such parameter P12 (Status prohibit Timer) and parameter P13 (STATUS prohibit).

To the parameter P12, a time interval at which to transmit a status PDU is set. That is, until a lapse of time set to the parameter P12 elapses after a status PDU is transmitted in response to polling, the status PDU is not transmitted even if polling is received.

By this setting, even if, for example, the base station transmits polling at a short cycle by mistake, the mobile station can adjust the time interval at which to transmit the status PDU to the base station side in response to the polling.

Further, to the parameter P13, an "ON" or "OFF" value is set that respectively validates or invalidates the setting of the parameter P12.

In the present embodiment, if the SIR value becomes 15 dB or less, the parameter P13 is changed from "OFF" to "ON". Further, the value of the parameter P12 is set larger as the SIR value deteriorates more. That is, if the wireless communication environment is good, the mobile station transmits a status PDU to the base station always in response to polling from the base station. If the wireless propagation path deteriorates, the frequency at which the status PDU is transmitted is reduced. That is, the retransmission control by use of an ARQ is mitigated.

The buffer monitor unit 17 prescribes an upper limit (buffer size) of the information accumulation capacity of the reordering buffer 161 by using a value set to such a parameter P4 (Rx Window size). To avoid overflow, the value of the parameter P4 is set to the value of the parameter P5 or greater. In the present embodiment, the value of the parameter P4 is set to the same value as that of the parameter P5, so that the buffer size of the retransmission buffer 26 agrees with that of the reordering buffer 161 always.

In the reordering buffer 161, the accumulated information pieces are reordered. This is because information pieces transmitted from the base station are not always accumulated in the reordering buffer 161 in the mobile station in the correct order owing to a transmission error etc.

To the parameter P11 (Reordering timer) related to the RLC PDU reception control unit 15, a waiting time until not-yet-received information is accumulated is set in order to reorder accumulated information pieces in the reordering buffer 161. That is, the RLC PDU reception control unit 15 reorders only existing and accumulated information pieces without waiting for the not-yet-received information after the waiting time set to the parameter P11 elapses.

In the present embodiment, the parameter P11 is set larger as the wireless propagation path deteriorates more. If the wireless propagation path is good, information pieces are highly possibly accumulated in the correct order in the reordering buffer 161 in the mobile station, so that the waiting time need not be long. However, if the wireless propagation path deteriorates, they are done so less possibly. Accordingly, to avoid deteriorations in quality of the information, the waiting time for the not-yet-received information is set longer if the wireless propagation path deteriorates.

To the parameter P15 (maximum number of times of L1-HARQ retransmission) related to the MAC PDU retransmission control unit 21, an upper limit of the number of times of retransmission in retransmission control by use of a layer 1 HARQ is set.

The hybrid automatic repeat request (HARQ) method inhibits the frequency of retransmission by use of an ARQ in the layer 2 by permitting the reception side to effectively utilize already-received data and the transmission side to retransmit only those data pieces that could not correctly be received by the reception side.

In the present embodiment, the layer 1 function unit 420 (520) in FIG. 2 and FIG. 3 respectively has an HARQ retransmission control unit (not illustrated), to conduct retransmission control by use of an ARQ after the number of times of retransmission by use of an HARQ reaches a value set to the parameter P15.

The MAC PDU retransmission control unit 21 counts the number of times of retransmission in the HARQ retransmission control unit in the layer 1 function unit 420 (520) and, if this number of times of retransmission reaches the value set to the parameter P15, stops retransmission control by use of a HARQ by the HARQ retransmission control unit. Retransmission information which is transmitted by the HARQ retransmission control unit may be generated from the information temporarily saved in the retransmission buffer 211.

In the present embodiment, the parameter P15 is set larger as the wireless propagation path deteriorates more. If the wireless propagation path deteriorates, as described above, the number of times of retransmission by use of an ARQ is reduced and, moreover, the number of times of retransmission by use of an HARQ is reduced to further reduce the processing loads in both of the stations.

Further, to the parameter P16 (buffer stagnant amount correction coefficient) related to the MAC PDU retransmission control unit 21, a ratio is set by which to multiply the amount of information stagnant in each of the buffers such as the SDU buffer 271, the retransmission buffers 26 and 211, etc. The parameter 16 is set only to the mobile station.

The MAC PDU retransmission control unit 21 in the mobile station actually measures the amount of information stagnant in each buffer and consecutively transmits it as a buffer status to the base station. Then, based on the received buffer status and state of the wireless propagation path, the base station allocates an inbound wireless band to the mobile station. A wider band is allocated to the mobile station in which more information is stagnant in particular.

In the present embodiment, if the SIR value becomes 15 dB or less, the parameter P16 is changed from "1" to "¼". That is, if the wireless communication environment is good, information stagnates less in the mobile station, so that an actually measured stagnant amount is transmitted to the base station as a buffer status.

If the wireless communication deteriorates, information stagnates in the mobile station more, so that if the actually measured stagnant amount is transmitted as it is to the base station as a buffer status, a wider band is allocated to the mobile station to inhibit communication with e other mobile stations. To avoid it, the value of the parameter P16 is set to "¼", to transmit a value smaller than the actually stagnant amount to the base station as the buffer status.

Next, a description will be given of operations of the wireless communication device in the present embodiment at the time of handover. Besides, a description will be given also of the layer 2 parameters P1, P2, and P14 related to the forwarding processing.

[Layer 2 Setting Alteration at the Time of Handover]

Figure 18:
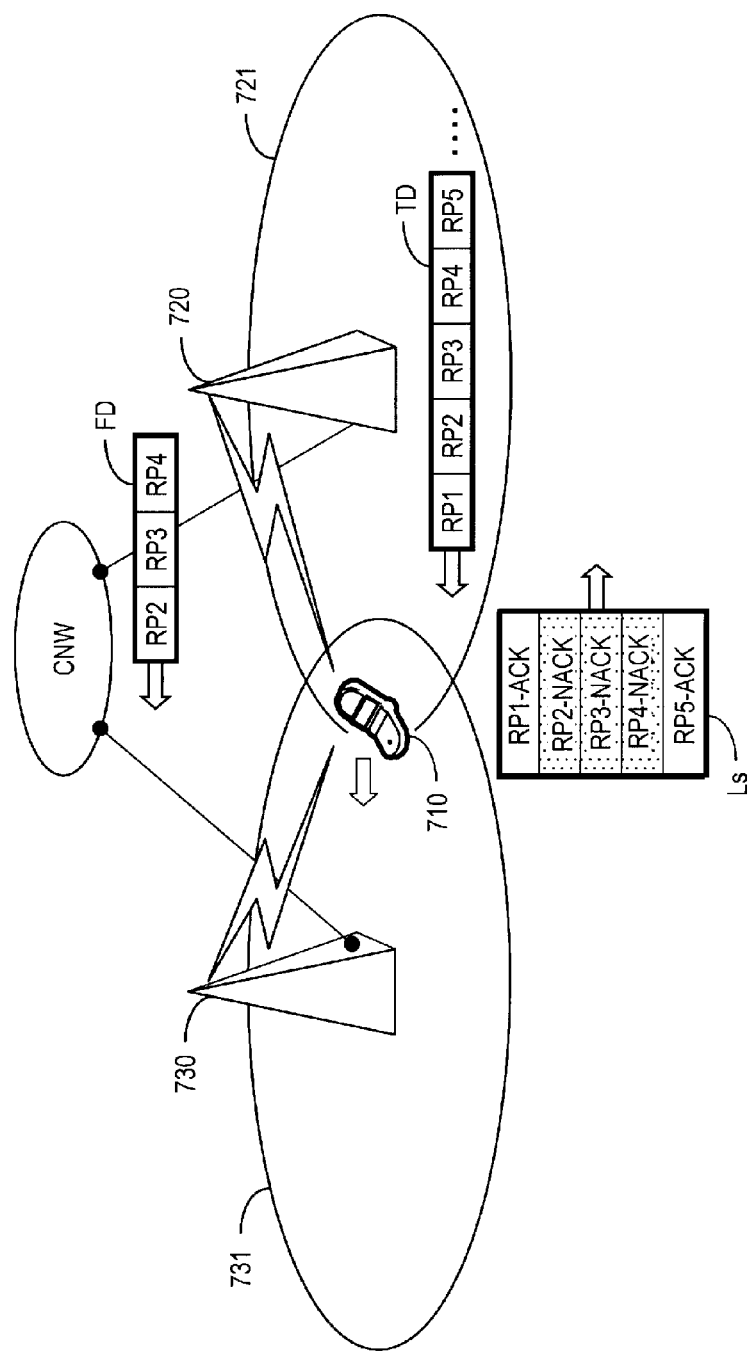
FIG. 18 is a diagram illustrating processing of forwarding between the base stations at the time of handover.

FIG. 18 is a diagram showing processing of forwarding between the base stations at the time of handover. Base stations 720 and 730 are connected to each other via the core network CNW, to make up one wireless communication system.

If a mobile station in communicating in a cell 721 of a base station 720 performs handover to a cell 731 in a base station 730, forwarding processing is performed between the base stations 720 and 730. Some of the information pieces RP1, RP2, . . . , and the ACK/NACK list Ls transmitted/received among the stations 710, 720, and 730 correspond to the information pieces illustrated in FIG. 15.

The mobile station 710 in communication with the base station 720 at the edge of the cell 721 receives information TD from the base station 720 consecutively. If the mobile station 710 cannot correctly receive the information pieces RP2, RP3, and RP4 owing to a transmission error, the ACK/NACK list Ls is transmitted from the mobile station 710 to the base station 720 based on retransmission control by use of an ARQ.

Afterward, the base station 720 the transmits the information pieces Pi2, Pi3, and Pi4 stagnant in the retransmission buffer 26 illustrated in FIG. 16 and the retransmission information pieces RP2, RP3, and RP4 corresponding to "NACK" in the ACK/NACK list Ls to the mobile station 710. However, if the mobile station 710 performs handover, the base station 720 transmits those retransmission information pieces RP2, RP, and RP4 as forwarding data FD to the handover-destination base station 730.

Further, the forwarding data FD includes IP information pieces accumulated in the SDU buffer 271 in the base station 720. The handover-destination base station 730 saves those transmitted forwarding data FD pieces in each buffer, so that the handover-destination base station 720 inherits the transmission processing performed on the mobile station 710.

In such a manner, due to handover, the forwarding data FD is transmitted from the handover-source base station 720 to the handover-destination base station 730; an increase in amount of the forwarding data transmitted/received leads to an increase in processing load, processing time, transfer load, etc. in both of the stations. Therefore, the forwarding data amount should preferably be small as much as possible.

Moreover, retransmission control by use of an ARQ or HARQ among the stations 710, 720, and 730 during the forwarding processing also leads to an increase in processing load etc., so that the frequency of retransmission among the stations 710, 720, and 730 should also be reduced.

Those purposes are realized by, for example, setting the layer 2 parameter values in the stations 710, 720, and 730 to the values of the parameter set 5 illustrated in FIG. 10 at the time of handover.

The parameter set 5 is different from the parameter set 4 in that the value of the parameter P2 (reception WINDOW size) is "512".

Figure 19:
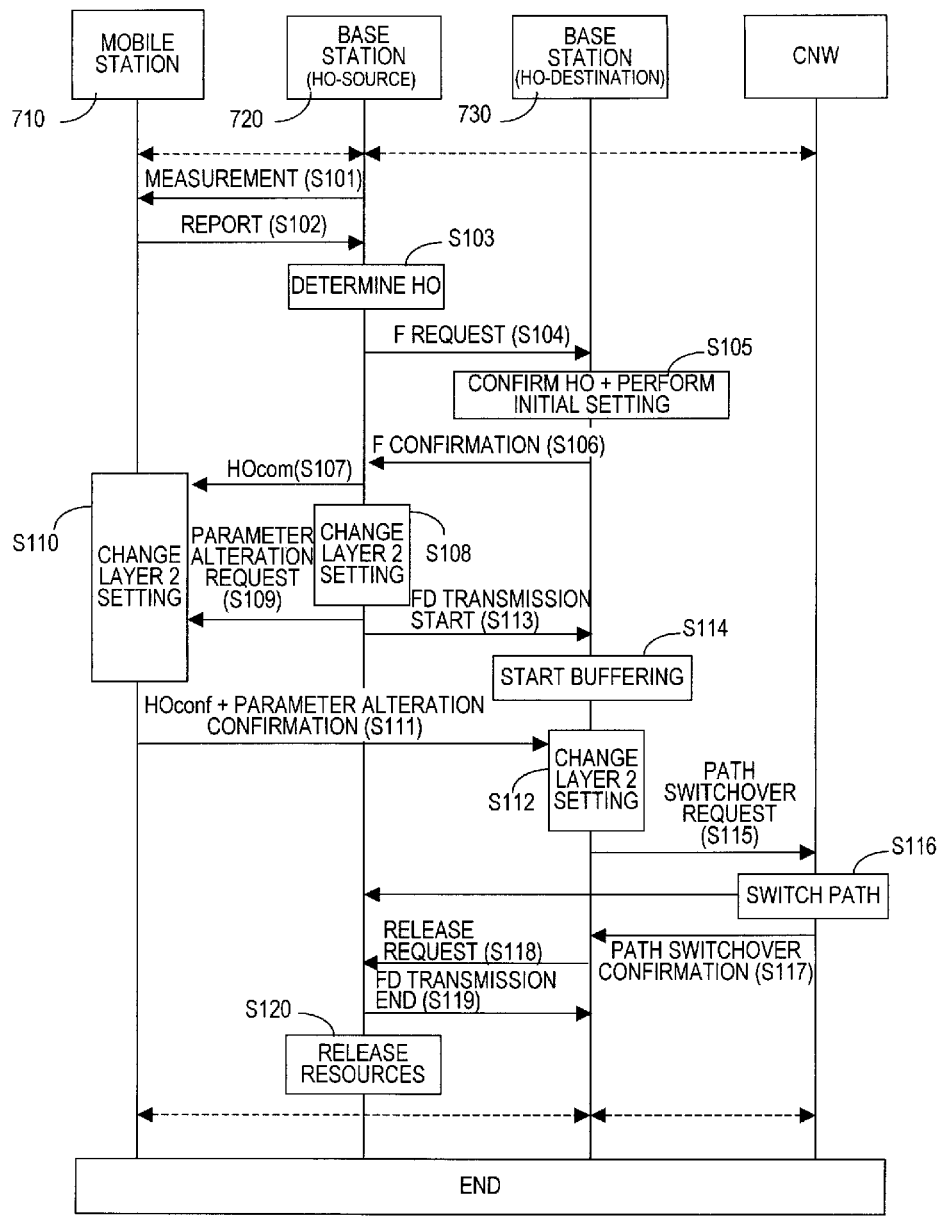
FIG. 19 is a sequence flow illustrating an example of parameter setting alteration in the layer 2 in handover.

FIG. 19 is a sequence flow showing an example of parameter setting alteration in the layer 2 in handover. The mobile station 710, the base stations 720 and 730, and the core network CNW in FIG. 19 correspond to the components in FIG. 18. Further, a broken-line arrow in the figure denotes a connection destination.

FIG. 19 shows a flow until the connection between the mobile station 710 and the core network CNW by way of the base station 720 is switched to the connection between the mobile station 710 and the core network CNW by way of the base station 730 in response to handover. Further, in FIG. 19, handover occurs when the stations 710, 720, and 730 are operating at the layer 2 parameter values denoted by "conventional BE" in Column 4 illustrated in FIG. 10. Then, the layer 2 parameter values of the stations 710, 720, and 730 are changed to the values denoted in the parameter set 5.

In the present embodiment, the stations 710, 720, and 730 have the same layer 2 parameter value (parameter set 5) set in themselves. However, the different parameter values may be set to the stations 710, 720, and 730 based on the roles of the stations 710, 720, and 730 as well as the functions in accordance with the layer 2 parameters in the forwarding processing at the time of handover.

Further, in the forwarding processing due to handover, to change the layer 2 parameter values, the handover control unit 4 in place of the SIR detection unit 3 illustrated in FIG. 4 detects the state of the mobile station making handover as a change in the wireless propagation path.

Furthermore, the handover control units 4 in the respective stations transmit/receive handover-related signals mutually. Further, the wireless communication device in the present embodiment has a handover signal reception unit (not illustrated) in the layer 1 function unit 420 (520) illustrated in FIG. 2 or FIG. 3. The handover signal reception unit is an external interface for signals transmitted/received by the handover control unit 4, which handover control unit 4 in each station transmits/receives the handover-related signals via its own handover signal transmission/reception unit.

The following will describe layer 2 parameter setting alteration at the time of handover along the sequence flow illustrated in FIG. 19.

The mobile station 710 at the edge of the cell measures an outbound reception sensitivity (SIR value) of the base station 720 as needed owing to measurement control by the handover-destination base station 720 and reports a result of the measurement to the handover-source base station 720 (steps S101 and S102).

When having received the report, the handover-source base station 720 decides whether to perform forwarding processing based on the measurement result of the outbound reception sensitivity (SIR value) denoted by the report (step S103).

To perform the forwarding processing, the base station 720 transmits a forwarding request to the effect that the forwarding processing be performed, to the handover-destination base station 730 (step S104).

The handover-destination base station 730 receives the forwarding request from the handover-source base station 720 and, in response to it, initializes itself for the forwarding processing (step S105). Then, the handover-destination base station 730 returns to the handover-source base station 720 a forwarding confirmation denoting that the initialization etc. are completed (step S106).

In the present embodiment, the handover control unit 4 illustrated in FIG. 4 in the handover-source base station 720 receives the forwarding confirmation from the handover-destination base station 730, thereby detecting the handover state of the mobile station.

In response to the detection, the handover control unit 4 transmits to the mobile station 710 a handover command HOcom for the execution of the forwarding processing (step S107). For example, the handover command HOcom has information of the handover-destination base station 730.

Moreover, in response to the forwarding confirmation, the handover control unit 4 in the base station 720 outputs a handover determination signal HO to the parameter setting alteration unit 5.

When having received the handover determination signal HO, the parameter alteration request generation unit 52 in the parameter setting alteration unit 5 references the parameter tables in the storage unit 9 to change the layer 2 parameter value in its own station to a value denoted by the parameter set 5 (step S108).

This halves the value of the parameter P2 (reception WINDOW size) from "1024" to "512". Based on the value set to such a parameter P2, the PDCP transmission processing unit 27 prescribes an upper limit (buffer size) of the information accumulation capacity of the SDU buffer 271. By halving the value of the parameter P2 in setting, the buffer size of the SDU buffer 271 is halved, to reduce the amount of the IP information input and accumulated in the SDU buffer 271 through flow control.

Further, the value of the parameter P5 is halved from "128" to "64" and the buffer size of the retransmission buffer 26 is halved, to reduce retransmission information stagnant in the retransmission buffer 26. Those information pieces are transmitted as forwarding data to the handover-destination base station 730 at the time of handover as described above. That is, by setting the parameters P2 and P5 small, the amount of the forwarding data is reduced.

Moreover, by changing the other layer 2 parameter values to a value denoted by the parameter set 5, the frequency is reduced of polling from the base station 720 to the mobile station 710, thereby reducing the frequency of retransmission by use of an ARQ during the forwarding processing.

To the parameter P14 related to the PDCP transmission processing unit 27, an "ON" or "OFF" value is set which denotes whether IP information pieces accumulated in the SDU buffer 271 should be transmitted. Typically, if the parameter P3 (RLC mode) is "AM", those accumulated IP information pieces are transmitted as forwarding data, so that in the present embodiment, the parameter P14 is not changed.

In the forwarding processing, the parameter P14 only needs to be set in the handover-source base station 720.

Besides the above, the parameter P1 (Reordering), not illustrated, is related to the forwarding processing. In the forwarding processing, forwarding data to be transmitted includes stagnant retransmission information and new IP information as described above. Furthermore, there is a case where the handover-destination base station 730 is supplied with IP information from the core network CNW newly.

Those information pieces are temporarily saved in the buffer (not illustrated) of the PDCP function unit 533 illustrated in FIG. 3 in the handover-destination base station 730 in its reception processing. However, those information pieces do not always arrive in the correct order and, therefore, are reordered.

The parameter P1 has an "ON" or "OFF" value set in it that denotes whether the reordering is validated. In the present embodiment, the parameter P1 is "ON" always and not changed.

Get back to FIG. 19 and FIG. 4, in which the parameter alteration request generation unit 52 in the parameter setting alteration unit 5, in response to the handover determination signal HO, generates a parameter alteration request to the effect that the layer 2 parameter value be changed to a value denoted by the parameter set 5 as in the case of the processing in step 2 illustrated in FIG. 8. Then, processing in steps S1 to S7 illustrated in FIG. 8 is performed, to transmit transmission data including the parameter alteration request to the mobile station 710 (step S109).

The handover control unit 4 in the mobile station 710 receives the handover command HOcom, to then output the handover determination signal HO to the parameter setting alteration unit 5 in its own station.

In response to the handover determination signal HO, the parameter alteration request analysis unit 53 in the parameter setting alteration unit 5 waits for the incoming parameter alteration request to the effect that the layer 2 parameter value transmitted from the base station 720 be changed to the value denoted by the parameter set 5.

Then, the mobile station 710 receives the transmission data including the parameter alteration request to perform processing in steps S8 to S16 illustrated in FIG. 8, so that the parameter alteration request is input to the parameter alteration request analysis unit 53.

The parameter alteration request analysis unit 53 changes the parameter LP2 in its own station's layer 2 to the value of the parameter set 5 denoted by the parameter alteration request as in the case of step S17 (step S110).

This setting reduces the frequency of transmitting the status PDU including the ACK/NAK list from at least the mobile station 710 to the base stations 720 and 730, thereby reducing the frequency of retransmitting by use of an ARQ during the forwarding processing.

The handover control unit 4 in the mobile station 710 identifies the handover-destination base station 730 based on the information of the handover destination in the handover command HOcom input from the base station 720. Then, the mobile station 710 is synchronized with the handover-destination base station 730. Moreover, the handover control unit 4 transmits to the handover-destination base station 730 a mobile station handover setting confirmation HOconf denoting that the layer 2 parameter setting based on handover in the mobile station 730 is completed.

Then, the parameter alteration confirmation generation unit 54 in the mobile station 710 generates a parameter alteration confirmation to the effect that the layer 2 parameter value in its own station is changed to the value of the parameter set 5, as in the case of step S18 in FIG. 9. Then, processing in steps S19 to S23 illustrated in FIG. 8 is performed, to transmit transmission data including the parameter alteration confirmation to the handover-destination base station 730 (step S111).

When having received the mobile station handover setting confirmation HOconf, the handover control unit 4 in the base station 730 outputs the handover determination signal HO to the parameter setting alteration unit 5 in its own station.

In response to the handover determination signal HO, the parameter alteration confirmation check unit 51 in the parameter setting alteration unit 5 waits for the incoming parameter alteration confirmation transmitted from the mobile station 710.

Then, the base station 730 receives the transmission data including the parameter alteration confirmation to perform processing in steps S24 to S32 illustrated in FIG. 9, so that the parameter alteration confirmation is input to the parameter alteration confirmation check unit 51.

The parameter alteration confirmation check unit 51 changes the parameter LP2 in its own station's layer 2 to the value of the parameter set 5 denoted by the parameter alteration confirmation as in the case of steps S33 and S34 (step S112).

This setting reduces the frequency of transmitting the status PDU including the ACK/NAK list from at least the base station 730 to the base stations 720 and the mobile station 710, thereby reducing the frequency of retransmitting by use of an ARQ during the forwarding processing.

Get back to step S108, in which the handover-source base station 720 transmits a parameter alteration request to the mobile station 710 (step S109) and then starts the forwarding processing to start transmitting forwarding data to the handover-destination base station 730 (step S113). As described above, in the base station 720, the layer 2 parameters P2 and P5 are set small, so that the amount of the forwarding data to be transmitted is reduced.

The handover-destination base station 730 starts accumulating the received forwarding data in its buffer (step S114).

In the sequence flow illustrated in FIG. 19, the handover-destination base station 730 changes the setting of the layer 2 parameter after starting accumulation of the forwarding data, which settings undergo concurrent processing in the background. After the layer 2 parameter set value in the handover-destination base station 730 is changed, the handover-destination base station 730 may notify the handover-source base station 720 to that effect to then permit the handover-source base station 720 to start transmission of the forwarding data.

Next, the handover-destination base station 730 outputs a path switchover request to a communication server in the core network CNW via a driver (step S115).

The communication server notifies the handover-source base station 720 of intended path switchover processing and performs the path switchover processing (step S116). Then, the communication server outputs a path switchover confirmation to the handover-destination base station 730 in response to the path switchover request (step S117).

In response to the path switchover confirmation, the handover-destination base station 730 outputs a buffer/resource release request to the handover-source base station 720 (step S118).

In response to the release request, the handover-source base station 720 starts releasing the buffers concurrently with the transmission of the forwarding data. After transmitting all the forwarding data, the handover-source base station 720 notifies the handover-destination base station 730 of termination of the forwarding processing (step S120) and releases all of resources related to the forwarding processing (step S120).

In such a manner, in the case of performing the forwarding processing by means of handover, by changing the setting of the layer 2 parameter value in each station to an appropriate value, the forwarding data amount and the frequency of retransmission by use of an ARQ or HARQ, to reduce the processing load, processing time, transfer load, etc. in each station.

Further, in the forwarding processing by means of handover described above, as handover-specific signals denoting performance of the forwarding processing, the handover command HOcom is transmitted to the mobile station 710 and the handover setting confirmation HOconf is transmitted to the handover-destination base station 730. However, in a case where alteration of the layer 2 parameter in each station is involved, transmission/reception of the parameter alteration request and the parameter alteration confirmation corresponds to that of the handover command HOcom and the mobile station setting confirmation HOconf. Therefore, those handover-specific signals need not necessarily be transmitted or received.

Next, a description will be given of a method for setting layer 2 parameter values in a mode different from that in the present embodiment.

[Implicit Method for Setting Layer 2 Parameter Values]

According to the above-described layer 2 parameter value setting method, the transmission side that has determined to change a layer 2 setting explicitly transmits layer 2 parameter values whose settings are to be changed as a parameter alteration request by using a control PDU or an MAC control block illustrated in FIG. 11 and FIG. 12. Then the reception side returns a parameter alteration confirmation to the transmission side similarly.

Accordingly, to create or analyze those values, a processing load and a delay occur. Moreover, if the wireless propagation path deteriorates, transmission data including those values may possibly provide a transmission error, in which case the processing loads etc. increase due to retransmission. Further, for example, in layer 2 setting alteration illustrated in the sequence flow in FIG. 8 and FIG. 9, if the parameter alteration confirmation provides a transmission error, the layer 2 parameter in the base station and the mobile station are not set to the same value until the parameter alteration confirmation is correctly transmitted by retransmission.

However, those stations each store the parameter table illustrated in FIG. 10 in their respective storage units 9 illustrated in FIG. 4.

Accordingly, according to the present setting method, each of the stations measures an SIR value and, if the SIR value denotes a certain prescribed level, references the parameter table stored in its storage unit 9, thereby implicitly changing the layer 2 parameter value in itself.

According to the implicit layer 2 parameter value setting method, if an SIR value input from the SIR measurement unit (not illustrated) denotes a certain prescribed level, the SIR detection unit 3 in FIG. 4 outputs the layer 2 setting alteration signal Q denoting a change in level of the SIR value to the parameter setting alteration unit 5. Then, in response to the entry of the layer 2 setting alteration signal Q, the parameter alteration request generation unit 52 in the parameter setting alteration unit 5 references the parameter table in the storage unit 9, to determine a layer 2 parameter value (parameter set) that corresponds to the layer 2 setting alteration signal Q.

Then, the parameter alteration request generation unit 52 changes the layer 2 parameter LP2 in its own station to the determined value.

In this case, the settings of the layer 2 parameters in the stations need to be changed further to the same value almost simultaneously; to do so, the SIR measurement units (not illustrated) of those stations need to output the same SIR value to the respective SIR detection units 3 simultaneously.

However, it is hard to realize because of errors in machine manufacturing and setting or differences in interference of the inbound and outbound signals. Accordingly, for example, if the SIR value lies in the vicinity of 20 dB, which is a borderline for layer 2 parameter value alteration illustrated in FIG. 10, there is a case where only one of the layer 2 parameter settings is changed according to the implicit setting method.

Therefore, in the case of explicitly setting a layer 2 parameter value, the base station always references an outbound SIR value which is measured by the base station through the above-described measurement control. This enables the base station to grasp fluctuations in SIR value of the base station and, based on the tendency of the fluctuations, implicitly estimate that the layer 2 parameter value in the mobile station has been changed. Then, if having estimated that the layer 2 parameter value in the mobile station has been change, the base station implicitly changes the layer 2 parameter value in itself.

Further, in the case of explicitly setting a layer 2 parameter value in the forwarding processing by means of handover in the mobile station illustrated in FIG. 19, each station need not transmit a parameter alteration request and a parameter alteration confirmation. Then, the mobile station 710 and the handover-destination base station 730 implicitly changes the layer 2 parameter values to the values denoted by the parameter set 5 illustrated in FIG. 10 in response to the handover command HOcom and the mobile station handover setting confirmation HOconf respectively.

In such a manner, the layer 2 parameter values can be set implicitly, in which case the processing loads and delays due to the generation of the parameter alteration request and the parameter alteration confirmation are eliminated. Moreover, a problem of an increase in retransmission processing owing to deteriorations of the wireless propagation path and a problem of disagreement in the layer 2 parameter values which are set in the base station and the mobile station are also eliminated.

[Second Embodiment]

Figure 20:
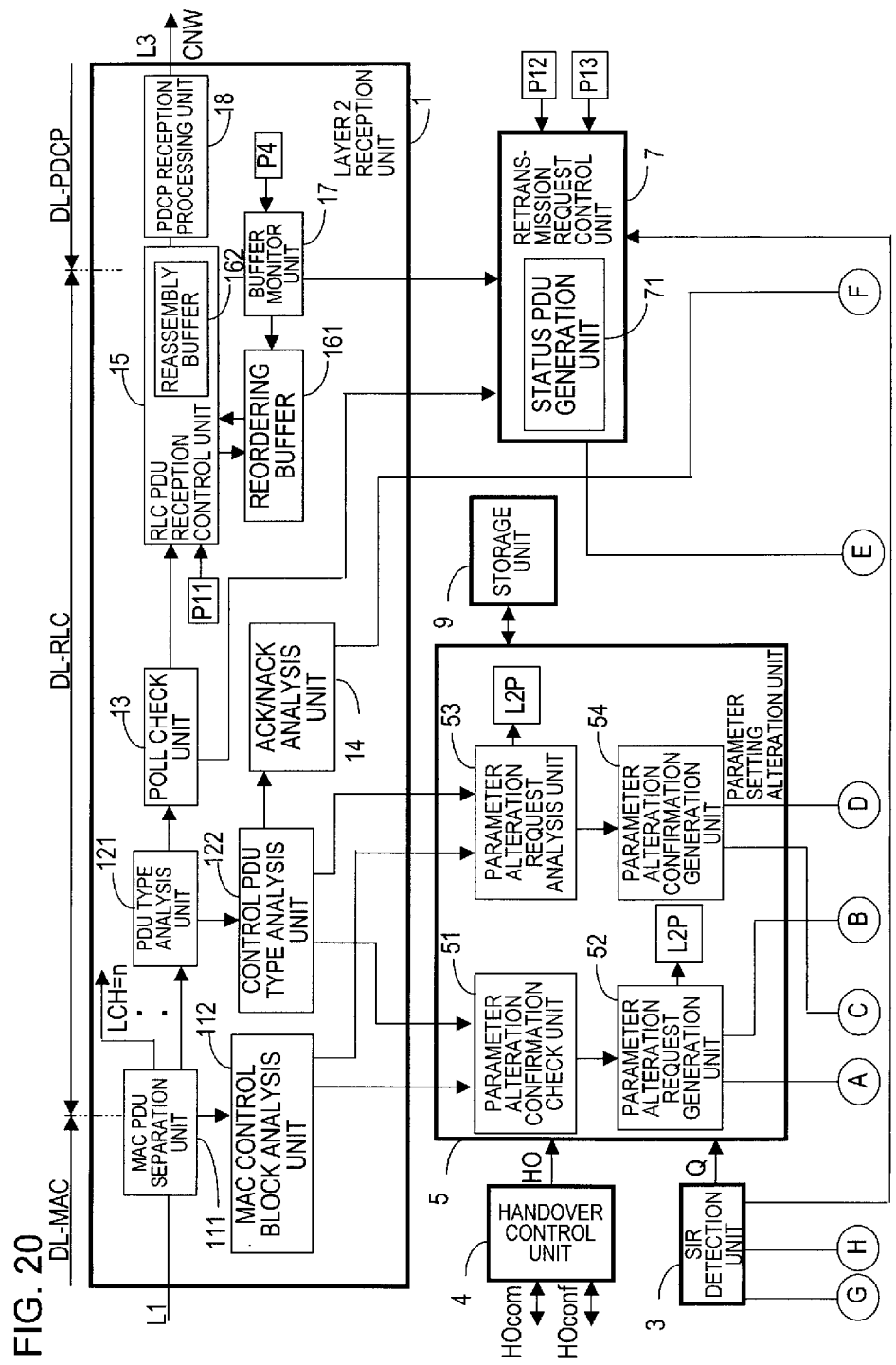
FIG. 20 is a block diagram illustrating a configuration example of the function unit which performs reception processing in the function unit 430 (530) in the layer 2 illustrated in FIG. 2 and FIG. 3 of a wireless communication device in a second embodiment.

FIG. 20 is a block diagram showing a configuration example of a function unit which performs reception processing in a function unit 430 (530) in a layer 2 illustrated in FIG. 2 and FIG. 3 of a wireless communication device in the second embodiment.

Figure 21:
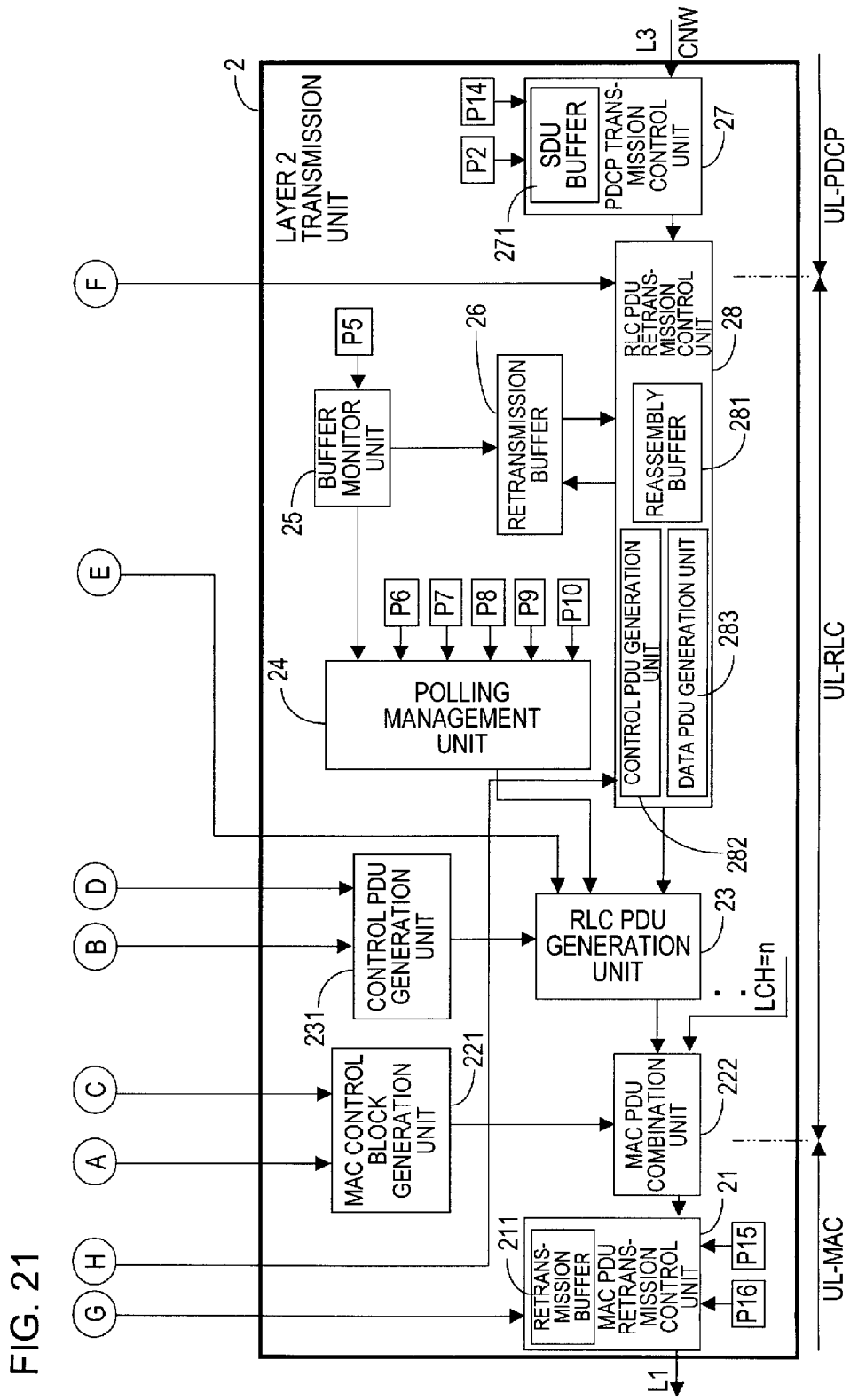
FIG. 21 is a block diagram illustrating a configuration example of the function unit which performs transmission processing in the function unit 430 (530) in the layer 2 illustrated in FIG. 2 and FIG. 3 of the wireless communication device in the second embodiment.

FIG. 21 is a block diagram showing a configuration example of the function unit which performs transmission processing in the function unit 430 (530) in the layer 2 illustrated in FIG. 2 and FIG. 3 of the wireless communication device in the second embodiment. The function units illustrated in FIG. 20 and FIG. 21 are discretely connected to terminals A to H respectively.

The wireless communication device in the second embodiment illustrated in FIG. 20 and FIG. 21 is different from that in the first embodiment show in FIG. 4 and FIG. 5 in that it has a retransmission ratio measurement unit 8 in place of the SIR detection unit 3, in which the identical reference symbols are given to the identical or corresponding components.

The following will describe the present second embodiment by assuming the side of a base station to be the transmission side and the side of a mobile station to be the reception side as in the case of the first embodiment except the already described description.

The retransmission ratio control unit 8 is a function unit that detects a change in state of a wireless propagation path and, in the base station, monitors the number of times of retransmission by use of an ARQ by an RLC PDU retransmission control unit 28, measures an ARQ retransmission ratio, monitors the number of times of retransmission by use of an HARQ by an MAC PDU retransmission control unit 211, and calculates an HARQ retransmission ratio. Further, in the mobile station, the retransmission ratio control unit 8 monitors a retransmission request (ACK/NACK) by use of an ARQ of a retransmission request control unit 7 and calculates the ARQ retransmission ratio. Moreover, in the mobile station, the retransmission control unit 8 monitors a retransmission request by use of an HARQ of an HARQ reception processing unit (not sown) in a function unit 420 in a layer 1 in FIG. 2 and calculates the HARQ retransmission ratio.

In the present second embodiment, a change in this retransmission ratio corresponds to a change in the wireless propagation path, so that based on the change in retransmission, the layer 2 parameter value is changed dynamically.

The following will describe explicit layer 2 parameter value setting alteration.

As described above, the retransmission ratio measurement unit 8 in the base station monitors the RLC PDU retransmission control unit 28 or the MAC PDU retransmission control unit 211, calculates the ARQ or HARQ retransmission ratio, and, if the retransmission ratio denotes a prescribed level, provides a parameter setting alteration unit 5 with a layer 2 setting alteration signal Q that denotes a change in retransmission ratio. The layer 2 setting alteration signal Q denoting a change in retransmission ratio and the layer 2 setting alteration signal Q denoting a change in level of the SIR value output by the SIR detection unit 3 described in the first embodiment are both output in response to a change in wireless communication and essentially the same as each other in layer 2 parameter value alteration. That is, processing to output the layer 2 setting alteration signal Q corresponds to step 1 illustrated in FIG. 8.

In response to the entry of the layer 2 setting alteration signal Q, a parameter alteration request generation unit 52 in the parameter setting alteration unit 5 in the base station references a parameter table defined in a storage unit 9, to determine a layer 2 parameter value corresponding to the layer 2 setting alteration signal Q.

FIG. 10 is an example of the parameter table, in which Column 5 prescribes a retransmission ratio X in four stages along with an SIR value and defines the corresponding layer 2 parameter values as parameter sets 1 to 4.

The parameter alteration request generation unit 52 generates a parameter alteration request to the effect that the layer 2 parameter value on the mobile station side be changed to a parameter value (parameter set) determined in the above-described protocol. This processing corresponds to step 2 illustrated in FIG. 8.

Hereinafter, the settings of layer 2 parameter values in the base station and the mobile station are changed along the sequence flows illustrated in FIG. 8 and FIG. 9.

In a case where the mobile station serves as the side of transmitting a parameter alteration request, the retransmission control unit 8 monitors the retransmission request control unit 7 and an HARQ reception processing unit (not illustrated) and, if the retransmission denotes a certain prescribed level similarly, provides the parameter setting alteration unit 5 in its own station with the layer 2 setting alteration signal Q denoting a change in retransmission ratio. Then, similarly, a parameter alteration request is transmitted from the mobile station to the base station.

Next, a description will be given of implicit layer 2 parameter value setting alteration.

If the retransmission ratio measured in each of the stations and denotes a certain prescribed level, the parameter table stored in the storage unit 9 in its own station is referenced to implicitly change the layer 2 parameter value in its own station.

According to an implicit layer 2 parameter value setting method in the second embodiment, the retransmission ratio measurement unit 8 in FIG. 20 measures an ARQ or HARQ retransmission ratio and, if the retransmission ratio denotes a certain prescribed level, provides the parameter setting alteration unit 5 with the layer 2 setting alteration signal Q denoting a change in retransmission ratio. Then, the parameter alteration request generation unit 52 in the parameter setting alteration unit 5 references the storage unit 9 to determine a layer 2 parameter value (parameter set) that corresponds to the layer 2 setting alteration signal Q and changes the later 2 parameter value LP2 to the determined value.

In this case, the layer 2 parameter values in the respective stations need to be changed in setting almost simultaneously; to do so, the retransmission ratio measurement units 8 in the respective stations need to measure the same retransmission ratio simultaneously.

Accordingly, as for the HARQ retransmission ratio, the retransmission measurement unit 8 in the base station monitors the number of times of retransmission by use of an HARQ of the MAC PDU retransmission control unit 211, while the retransmission measurement unit 8 in the mobile station monitors a retransmission ratio corresponding to the number of times of retransmission by use of an HARQ of the HARQ reception processing unit (not illustrated) and calculates the retransmission ratio of each HARQ.

Further, as for the ARQ retransmission ratio, the retransmission measurement unit 8 in the base station monitors the number of times of retransmission by use of an ARQ of the RLC PDU retransmission control unit 28, while the retransmission measurement unit 8 in the mobile station monitors a retransmission request (ACK/NACK) corresponding to the number of times of retransmission by use of an ARQ of the retransmission request control unit 7 and calculates the retransmission ratio of each ARQ.

In such a manner, by monitoring the "number of times of retransmission" and the "retransmission request" respectively, the base station and the mobile station can calculate the same retransmission ratio. Therefore, in the case of changing the layer 2 parameter value in accordance with the retransmission ratio X of the parameter table in FIG. 10, the base station and the mobile station performs setting alteration simultaneously.

In such a manner, the settings of the layer 2 parameters can be changed dynamically on the basis of a change in retransmission ratio corresponding to a change in the wireless propagation path. Further, the second embodiment may be used along with layer 2 parameter value setting alteration based on a change in SIR value in the first embodiment. Accordingly, the layer 2 parameter value is appropriately changed on the basis of both factors of a change in SIR value corresponding to a change in the wireless propagation path and a change in retransmission ratio, so that the layer 2 parameter value is set to a more appropriate value in response to a change in state of the wireless propagation path. Moreover, it is possible to perform crosscheck by use of the SIR value and the retransmission ratio. For example, if the SIR value and the retransmission ratio are large, the present wireless communication device decides that the wireless propagation path is good and the retransmission ratio is increased due to a malfunction of the transmission/reception circuit and does not change the setting of the layer 2 parameter.

What is claimed is:

1. A communication control method in a mobile wireless system in which a transmission-side wireless communication device and a reception-side wireless communication device are connected to each other via a wireless propagation path, the method comprising:
    setting a parameter for data link control to the transmission-side wireless communication device and the reception-side wireless communication device; and
    changing the set parameter in response to a change in state of the wireless propagation path,
    wherein the transmission-side wireless communication device is installed in a handover-source base station,
    a first reception-side wireless communication device, which is the reception-side wireless communication device, is installed in a mobile station, and a second reception-side wireless communication device is installed in a handover-destination base station;
    a change in state of the wireless propagation path indicates a state in which the mobile station performs handover between the handover-source base station and the handover-destination base station,
    the transmission-side wireless communication device has a parameter table that defines a parameter value corresponding to the handover;
    the transmission-side wireless communication device:
        determines, by the parameter table, the parameter value corresponding to the handover that corresponds to the state of the wireless propagation path detected in the transmission-side wireless communication device;
        changes the parameter thereof to the parameter value corresponding to the handover,
        transmits, to the first reception-side wireless communication device, a parameter alteration request including the parameter value corresponding to the handover,
        starts transmission of forwarding data to the second reception-side wireless communication device;
    the first reception-side wireless communication device:
        changes the parameter thereof to the parameter value corresponding the handover and included in the parameter alteration request based on the parameter alteration request and
        transmits, to the second reception-side wireless communication device, a parameter alteration confirmation including the parameter value corresponding to the handover; and
    the second reception-side wireless communication device changes the parameter thereof to the parameter value corresponding to the handover and included in the parameter alteration confirmation based on the parameter alteration confirmation.

2. The communication control method according to claim 1,
    wherein the parameter for data link control is a layer 2 protocol parameter.

3. The communication control method according to claim 1,
    wherein the parameter is a value that determines a frequency of retransmission;

the transmission-side wireless communication device performs the retransmission of transmission information which has encountered a transmission error; and if a change in state of the wireless propagation path indicates deterioration of the state of the wireless propagation path, the parameter corresponding to the wireless propagation state is set to a value by which the frequency of the retransmission is reduced.

4. The communication control method according to claim 1, wherein the parameter is a value that determines an upper limit of a size of a buffer in which transmission information to be retransmitted is accumulated;

the transmission-side wireless communication device performs the retransmission of the transmission information that has encountered a transmission error; and if a change in state of the wireless propagation path indicates deterioration of the state of the wireless propagation path, the parameter corresponding to the wireless propagation state is set to a value by which the buffer size is reduced.

5. The communication control method according to claim 1, wherein the reception-side wireless communication device has a parameter table that defines parameter values respectively corresponding to a plurality of states of the wireless propagation path;

the reception-side wireless communication device determines, by the parameter table thereof, the parameter value corresponding to the state of the wireless propagation path detected in the reception-side wireless communication device, and changes the parameter of the reception-side wireless communication device to the determined parameter value;

the transmission-side wireless communication device receives the state of the wireless propagation path detected by the reception-side wireless communication device and transmitted from the reception-side wireless communication device and, based on the tendency of the state, estimates that the parameter of the reception-side wireless communication device is changed; and the transmission-side wireless communication device determines, by the parameter table thereof, the parameter value corresponding to the state of the wireless propagation path detected in the transmission-side wireless communication device, and changes the parameter of the transmission-side wireless communication device to the determined parameter value.

6. The communication control method according to claim 1, wherein the transmission-side wireless communication device performs retransmission of transmission information that has encountered a transmission error;

the state of the wireless propagation path is denoted by a retransmission ratio of the retransmission;

wherein reception-side wireless communication device has a parameter table that defines parameter values respectively corresponding to a plurality of states of the wireless propagation path;

the transmission-side wireless communication device monitors the number of times of the retransmission managed by the transmission-side wireless communication device in the retransmission and calculates the retransmission ratio based on the number of times of the retransmission, while the reception-side wireless communication device monitors a retransmission request corresponding to the number of times of the retransmission managed by the reception-side wireless communication device in the retransmission and calculates the retransmission ratio based on the retransmission request;

the reception-side wireless communication device determines, by the parameter table thereof, the parameter value corresponding to the state of the wireless propagation path detected in the reception-side wireless communication device, and changes the parameter of the reception-side wireless communication device to the determined parameter value; and the transmission-side wireless communication device determines, by the parameter table thereof, the parameter value corresponding to the state of the wireless propagation path detected in the transmission-side wireless communication device, and changes the parameter of the transmission-side wireless communication device to the determined parameter value.

7. The communication control method according to claim 1, wherein the transmission-side wireless communication device, the first reception-side wireless communication device, and the second reception-side wireless communication device each have a parameter table that defines parameter values respectively corresponding to the handovers;

the first reception-side wireless communication device determines, by the parameter table thereof, the parameter value corresponding to the handover in response to the handover command; and in response to the mobile station handover setting confirmation, the second reception-side wireless communication device determines the parameter value corresponding to the handover by the parameter table thereof; and the second reception-side wireless communication device changes the parameter thereof to the parameter value corresponding to the handover.

8. The communication control method according to claim 1, wherein the parameter alteration request and the parameter alteration confirmation are transmitted as a control PDU or an MAC control block.

9. A wireless communication device positioned on a side of transmission and a wireless communication device position on a side of reception that are connected to each other in a mobile wireless system via a wireless propagation path, the wireless communication device positioned on the side of transmission comprising:, a parameter setting alteration unit that sets a parameter for data link control; and a state change detection unit that detects a change in state of the wireless propagation path, wherein the parameter setting alteration unit changes setting of the parameter in response to detection of the change in state of the wireless propagation path, wherein the wireless communication device positioned on a side of transmission is installed in a handover-source base station, a first reception-side wireless communication device, which is the wireless communication device positioned on a side of transmission, is installed in a mobile station, and a second reception-side wireless communication device installed in a handover-destination base station:

a change in state of the wireless propagation path indicates a state in which the mobile station performs handover between the handover-source base station and the handover-destination base station,
the wireless communication device positioned on a side of transmission has a parameter table that defines a parameter value corresponding to the handover;
the wireless communication device positioned side of transmission:
determines, by the parameter table, the parameter value corresponding to the handover that corresponds to the state of the wireless propagation path detected in the transmission-side wireless communication device;
changes the parameter thereof to the parameter value corresponding to the handover and transmits, to the first reception-side wireless communication device, a parameter alteration request including the parameter value corresponding to the handover; and
starts transmission of forwarding data to the second reception-side wireless communication device;
the first reception-side wireless communication device:
changes the parameter thereof to the parameter value corresponding to he handover and included in the parameter alteration request based on the parameter alteration request, and
transmits, to the second reception-side wireless communication device, a parameter alteration confirmation including the parameter value corresponding to the handover; and
the second reception-side wireless communication device changes the parameter thereof to the parameter value corresponding to the handover and included in the parameter alteration confirmation based on the parameter alteration confirmation.

10. A mobile wireless system having a transmission-side wireless communication device and a reception-side wireless communication device which are connected to each other via a wireless propagation path,
wherein the transmission-side wireless communication device and the reception-side wireless communication device each have:
a parameter setting alteration unit that sets a parameter for data link control; and
a state change detection unit that detects a change in state of the wireless propagation path; and
wherein the parameter setting alteration unit changes setting of the parameter in response to detection of the change in state of the wireless propagation path,
wherein the transmission-side wireless communication device installed in a handover-source base station,
a first reception-side wireless communication device which is the reception-side wireless communication device, is installed in a mobile station, and a second reception-side wireless communication device is installed in a handover-destination base station;
a change in state of the wireless propagation on path indicates a state in which the mobile station performs handover between the handover-source based station and the handover-destination base station,
the transmission-side wireless communication device has a parameter table that defines a parameter corresponding to he handover;
the transmission-side wireless communication device:
determines, by the parameter table, the parameter value corresponding to handover that corresponds to the state of the wireless propagation path detected in the transmission-side wireless communication device:
changes the parameter thereof to the parameter value corresponding to the handover;
transmits, to the first reception-side wireless communication device, a parameter alteration request including the parameter value corresponding to the handover,
starts transmission of forwarding data to the second reception-side wireless communication device;
the first reception-side wireless communication device:
changes the parameter thereof to the parameter value corresponding to the handover and included in the parameter alteration request based on the parameter alteration request, and
transmits, to the second reception-side wireless communication device, a parameter alteration confirmation including the parameter value corresponding to the handover; and
the second reception-side wireless communication device changes the parameter hereof to the parameter value corresponding to the handover and included in the parameter alteration confirmation based on the parameter alteration.

11. The mobile wireless system according to claim 10,
wherein the parameter for the data link control is a layer 2 protocol parameter.

* * * * *